United States Patent
Kawamoto et al.

[11] Patent Number: 5,910,781
[45] Date of Patent: Jun. 8, 1999

[54] CAPACITIVE ANGLE DETECTOR

[75] Inventors: Masayuki Kawamoto, Toyota; Kimitoshi Tsuzi, Mie; Jun-ichi Nakaho, Niwa, all of Japan

[73] Assignee: Kabushiki Kaisha Tokai-Rika-Denki-Seisakusho, Aichi-ken, Japan

[21] Appl. No.: 08/994,945

[22] Filed: Dec. 19, 1997

[30] Foreign Application Priority Data

Dec. 19, 1996 [JP] Japan ..................... 8-339982
Apr. 3, 1997 [JP] Japan ..................... 9-85384

[51] Int. Cl.$^6$ ................................. G08C 19/10
[52] U.S. Cl. .................. 340/870.37; 318/662; 324/658; 324/600
[58] Field of Search .............. 340/870.37; 318/662; 324/658, 600

[56] References Cited

U.S. PATENT DOCUMENTS

| | | | |
|---|---|---|---|
| 3,732,553 | 5/1973 | Hardway, Jr. ................ | 340/870.37 |
| 5,574,442 | 11/1996 | Kinoshita et al. ........... | 340/870.38 |
| 5,598,153 | 1/1997 | Brasseur et al. ............ | 340/870.37 |

FOREIGN PATENT DOCUMENTS 4-83114   3/1992   Japan .
A-2 279 460   1/1995   United Kingdom .

*Primary Examiner*—Michael Horabik
*Assistant Examiner*—Albert K. Wong
*Attorney, Agent, or Firm*—Oliff & Berridge, PLC

[57] ABSTRACT

A capacitive angle detector according to the present invention is capable of detecting a rotating angle with a high precision. The capacitive angle detector includes a first member, a second member and a third member. The first and second members have a plurality of electrodes thereon to form a plurality of capacitors. The electrodes on the first member and the electrodes on the second member are free from relative rotation and arranged opposite each other. The third member rotates relative to the first and second members in accordance with a rotating movement of a rotating body, thus changing capacitance values of the capacitors. Based on capacitance values of the capacitors, the capacitive angle detector detects a rotating angle of the rotating body. In this capacitive angle detector, the third member is made of a dielectric material or a conductive metal material. The third member is partially interposed between the electrodes arranged opposite each other.

5 Claims, 24 Drawing Sheets

CAPACITIVE ANGLE DETECTOR

INCORPORATION BY REFERENCE

The entire disclosures of Japanese Patent Application No. HEI 9-85384 filed on Apr. 3, 1997 and Japanese Patent Application No. HEI 8-339982 filed on Dec. 19, 1996, including specifications, drawings and abstracts, are incorporated herein by reference in their entirety.

BACKGROUND OF THE INVENTION

1. Field of the Invention

The present invention relates to a capacitive angle detector for detecting a rotating angle of a rotating shaft.

2. Description of the Related Art

A conventional capacitive angle detector is disclosed in Japanese Patent Application Laid-Open No. HEI 4-83114. As shown in FIG. 34, this capacitive angle detector 100 includes a first stationary disk 101, a second stationary disk 102 and a rotating disk 103 arranged between the first and second stationary disks 101, 102. The first stationary disk 101 has on a lower surface thereof electrodes 101a, 101b which are offset from each other by 90°. On the other hand, the second stationary disk 102 has on an upper surface thereof electrodes 102a, 102b which are arranged in the same manner as the electrodes 101a, 101b. Furthermore, the rotating disk 103 has on an upper surface thereof electrodes 103a, 103c, and it has on a lower surface thereof electrodes 103b, 103d. The electrodes 103a, 103b are located radially outward of the electrodes 103c, 103d.

The electrodes 101a, 103c and the electrodes 103d, 102a constitute a capacitor, while the electrodes 101b, 103a and the electrodes 103b, 102b constitute another capacitor. Capacitance values of these capacitors change in accordance with a rotating movement of the rotating disk 103 in the direction of A or in the other direction. That is, the capacitance of the capacitor constituted by the electrodes 101a, 103c and the electrodes 103d, 102a changes as indicated by 1a of FIG. 35, while the capacitance of the capacitor constituted by the electrodes 101b, 103a and the electrodes 103b, 102b changes as indicated by 1b of FIG. 35. These capacitance changes are phase-shifted from each other by 90°. By detecting these capacitance changes, it is possible to detect a rotating angle in the whole range of 360°.

In this capacitive angle detector 100, however, the electrodes 103a, 103b and the electrodes 103c, 103d are disposed on radially different locations of the rotating disk 103. That is, the electrodes 103a, 103b are located radially outward of the electrodes 103c, 103d. Because the electrodes 103a, 103b and the electrodes 103c, 103d cause capacitive coupling, it is impossible to detect capacitance changes precisely. Hence, this capacitive angle detector 100 is unable to detect a rotating angle precisely.

It is an object of the present invention to provide a capacitive angle detector capable of detecting a rotating angle with a high precision.

SUMMARY OF THE INVENTION

According to one aspect of the present invention, there is provided a capacitive angle detector including: first and second members having a plurality of electrodes thereon to form a plurality of capacitors, the electrodes on the first member and the electrodes on the second member being free from relative rotation and arranged opposite each other; a third member arranged between the first and second members and moving relative to the first and second members in accordance with a rotating movement of a rotating body, the third member thereby changing capacitance values of the capacitors; and the capacitive angle detector detecting a rotating angle of the rotating body based on capacitance values of the capacitors. In this capacitive angle detector, the third member is made of a dielectric material or a conductive metal material, and partially interposed between the electrodes arranged opposite each other.

Hence, there is no possibility of capacitive coupling occurring in the third member.

Furthermore, the capacitors formed by the first and second members may be composed of a plurality of sets of capacitors. In this case, in accordance with a rotating movement of the third member, capacitance values of respective sets of the capacitors may change with a predetermined phase difference.

In this capacitive angle detector, the third member is made of a dielectric material or a conductive metal material, and electric charges are immovable among those of the capacitors which are irrelevant to capacitance measurement. Hence, there is no possibility of capacitive coupling occurring in the third member. In addition, when detecting capacitance values of certain capacitors, it is possible to eliminate the influences of electric charges stored in the other capacitors which are irrelevant to capacitance detection.

Furthermore, the electrodes on the first member may be formed by quarter-dividing a circular electrode having a predetermined width uniformly in a circumferential direction, and the electrode on the second member arranged opposite the electrodes on the first member may be a circular electrode having a predetermined width.

In this case, the respective four electrodes on the first member constitute together with the electrode on the second member four capacitors. In detecting a rotating angle of the third member based on capacitance values of these four capacitors, there is no possibility of capacitive coupling occurring in the third member. In addition, it is possible to eliminate the influences of electric charges stored in the other capacitors that are irrelevant to capacitance detection.

Furthermore, the first and second members may have four capacitors thereon, and a rotating angle of the rotating body may be detected based on a capacitance difference between a capacitance sum of two of the capacitors and a capacitance sum of the other two capacitors.

In this case, two distinct capacitance difference values can be obtained by changing a combination of two capacitors with the other two capacitors. Based on these two distinct capacitance difference values, it is possible to detect a rotating angle of the rotating body precisely.

In addition, the electrodes on the first member may be formed by half-dividing large and small-diameter circular electrodes each having a predetermined width and offsetting the half-divided large and small-diameter electrodes from each other uniformly by 90°, and the electrodes on the second member arranged opposite the electrodes on the first member may be composed of large and small-diameter circular electrodes each having a predetermined width.

In this case, the electrodes formed by half-dividing the large-diameter circular electrode on the first member and the large-diameter circular electrode on the second member constitute two capacitors, and the electrodes formed by half-dividing the small-diameter circular electrode on the first member and the small-diameter circular electrode on the second member constitute the other two capacitors. It is possible to detect a rotating angle of the third member based on capacitance values of these capacitors.

Furthermore, the first and second members may have four capacitors thereon, and a rotating angle of the rotating body may be detected based on a capacitance difference of two of the capacitors composed of the large-diameter circular electrodes and a capacitance difference of the other two capacitors composed of the small-diameter circular electrodes.

In this case, the capacitive angle detector detects a rotating angle of the rotating body based on a capacitance difference of two capacitors composed of the large-diameter circular electrodes and a capacitance difference of the other two capacitors composed of the small-diameter circular electrodes. Accordingly, it is possible to detect a rotating angle of the rotating body precisely.

In addition, the capacitive angle detector may further include a reference capacitor for referring to capacitance values of the capacitors, and voltages applied to the capacitors may be changed based on capacitance values of the capacitors that have been changed by disturbances and a capacitance value of the reference capacitor.

In this case, the capacitive angle detector is able to eliminate capacitance changes of the capacitors that have been caused by disturbances by applying appropriate voltages to the capacitors. It is thereby possible to enhance a precision in detecting an angle.

BRIEF DESCRIPTION OF THE DRAWINGS

Further objects, features and advantages of the present invention will become apparent from the following description of the preferred embodiments with reference to the accompanying drawings, wherein.

DETAILED DESCRIPTION OF PREFERRED EMBODIMENTS

Figure 1:
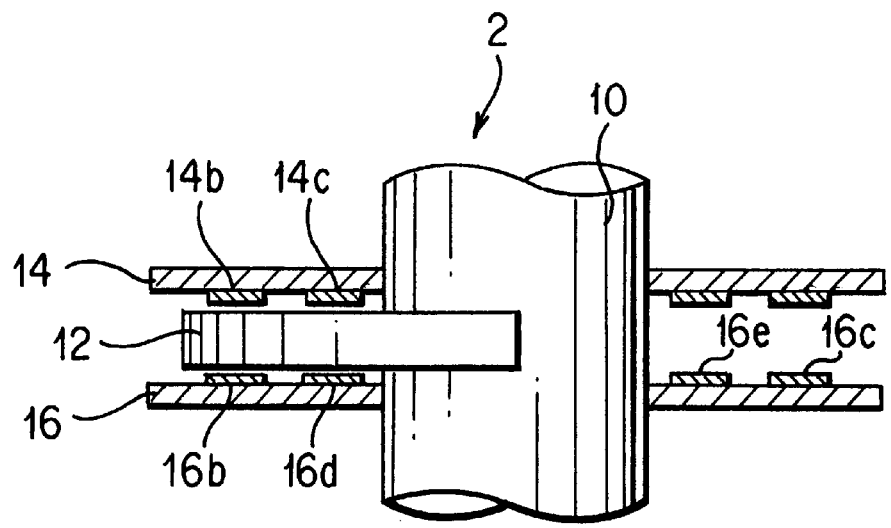
FIG. 1 is a schematic view of a capacitive angle detector according to a first embodiment.

A capacitive angle detector according to a first embodiment of the present invention will now be described with reference to FIGS. 1 through 11. FIG. 1 schematically illustrates a capacitive angle detector 2. This capacitive angle detector 2 includes a rotating body 12 attached to a rotating shaft 10 and rotating together therewith, a first stationary plate 14 spaced apart upward from the rotating body 12 by a predetermined distance, and a second stationary plate 16 spaced apart downward from the rotating body 12 by a predetermined distance.

Figure 2:
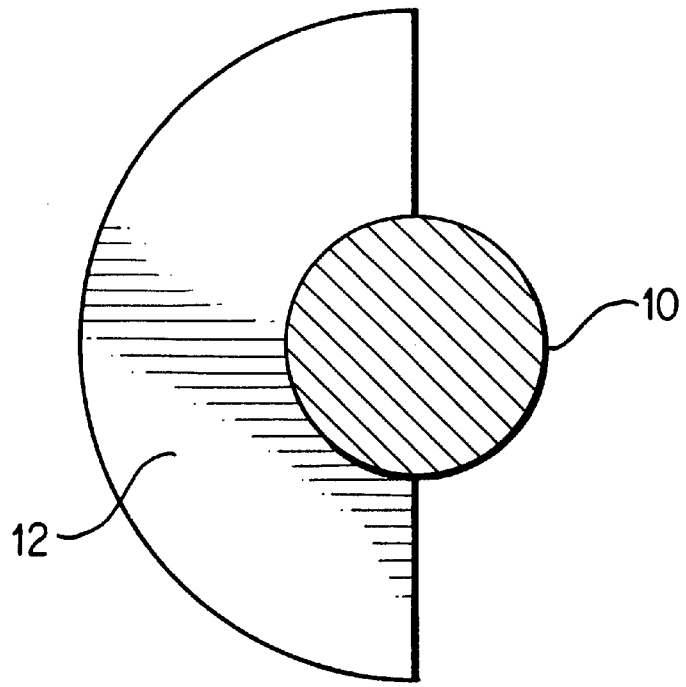
FIG. 2 is a plan view of a rotating body of the capacitive angle detector according to the first embodiment.
Figure 3:
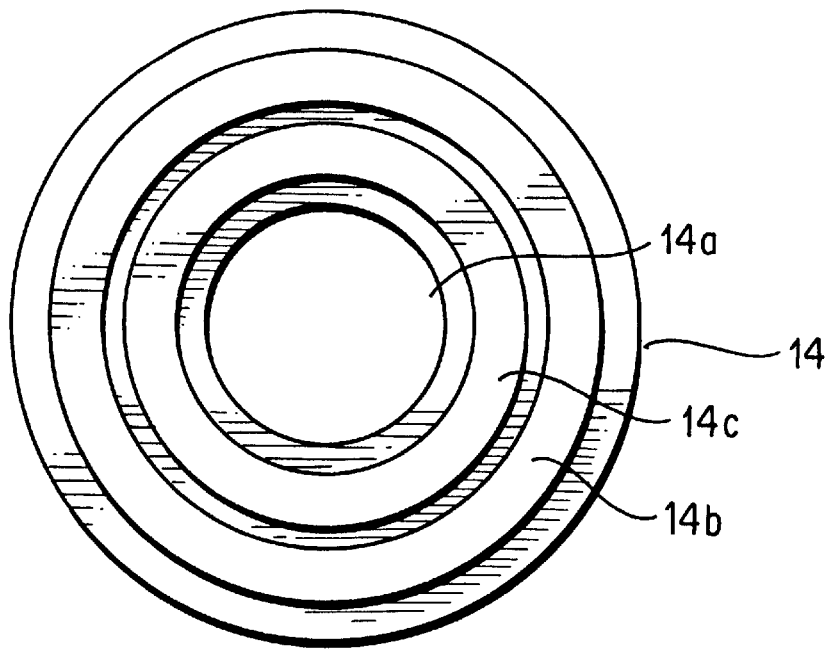
FIG. 3 illustrates a back surface of a first stationary plate of the capacitive angle detector according to the first embodiment.

The rotating body 12 has a semicircular shape as illustrated in FIG. 2 and is made of a dielectric material. This rotating body 12 is attached to an outer peripheral wall of the rotating shaft 10. As shown in FIG. 3, the first stationary plate 14 is a disk member. This disk member has in a central portion thereof a through opening 14a through which the rotating shaft 10 is rotatably passed. The first stationary plate 14 has on a back face thereof an outer common electrode 14b and an inner common electrode 14c. The outer and inner common electrodes 14b, 14c are both formed as a ring-shaped electrode having a predetermined width, and arranged to face the rotating body 12.

Figure 4:
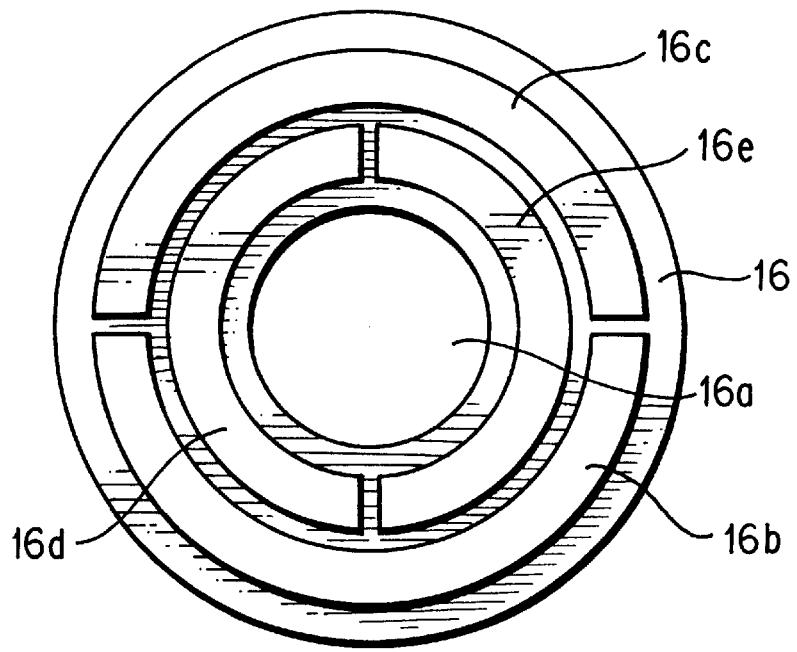
FIG. 4 is a plan view of a second stationary plate of the capacitive angle detector according to the first embodiment.

As shown in FIG. 4, the second stationary plate 16 is a disk member. This disk member also has in a central portion thereof a through opening 16a through which the rotating shaft 10 is rotatably passed. The second stationary plate 16 has on a front face thereof a first outer electrode 16b and a second outer electrode 16c. The first and second outer electrodes 16b, 16c are formed by half-dividing a ring-shaped electrode having a predetermined width. A first inner electrode 16d and a second inner electrode 16e, which are also formed by half-dividing a ring-shaped electrode having a predetermined width, are arranged radially inward of the first and second outer electrodes 16b, 16c. The first and second inner electrodes 16d, 16e are offset from the first and second outer electrodes 16b, 16c by 90°.

The rotating shaft 10, to which the rotating body 12 is attached, is connected to a steering shaft or the like of a vehicle. The first and second stationary plates 14, 16 are attached to appropriate stationary portions of a steering column or the like, such that the first and second outer electrodes 16b, 16c on the second stationary plate 16 face the outer common electrode 14b on the first stationary plate 14, and that the first and second inner electrodes 16d, 16e face the inner common electrode 14c on the first stationary plate 14.

The outer common electrode 14b on the first stationary plate 14 and the first outer electrode 16b on the second stationary plate 16 constitute a variable capacitor $C_{X1a}$, the outer common electrode 14b on the first stationary plate 14 and the second outer electrode 16c on the second stationary plate 16 a variable capacitor $C_{X1b}$, the inner common electrode 14c on the first stationary plate 14 and the second inner electrode 16d on the second stationary plate 16 a variable capacitor $C_{X2a}$, and the inner common electrode 14c on the first stationary plate 14 and the second inner electrode 16e on the second stationary plate 16 a variable capacitor $C_{X2b}$ respectively.

Figure 5A:
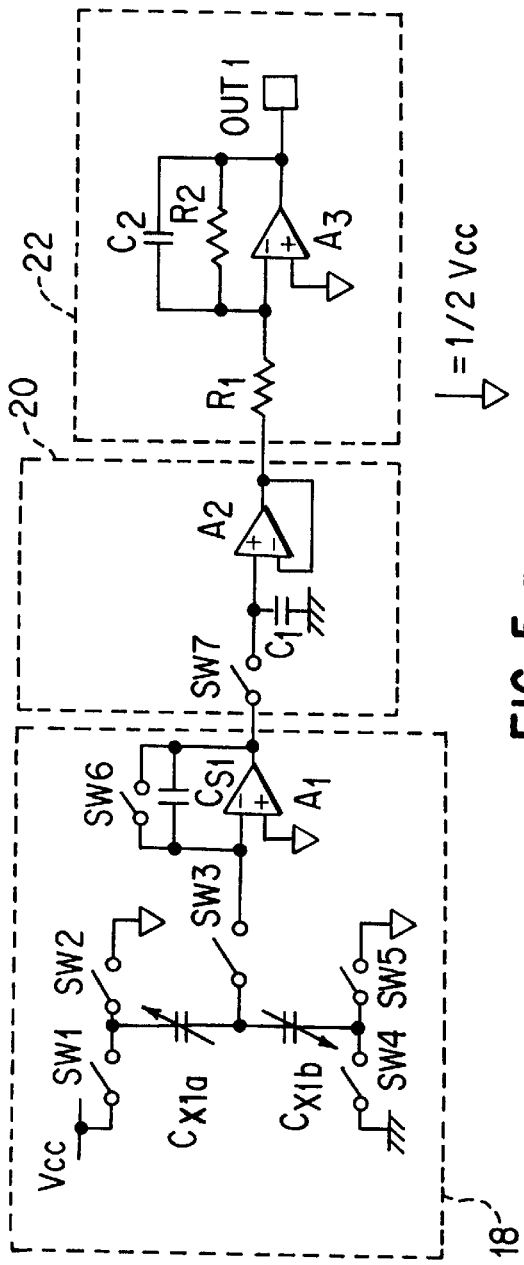
FIGS. 5(a) and 5(b) are circuit diagrams of a capacitance difference detecting circuit for detecting a difference in capacitance between capacitors of the capacitive angle detector according to the first embodiment.
Figure 5B:
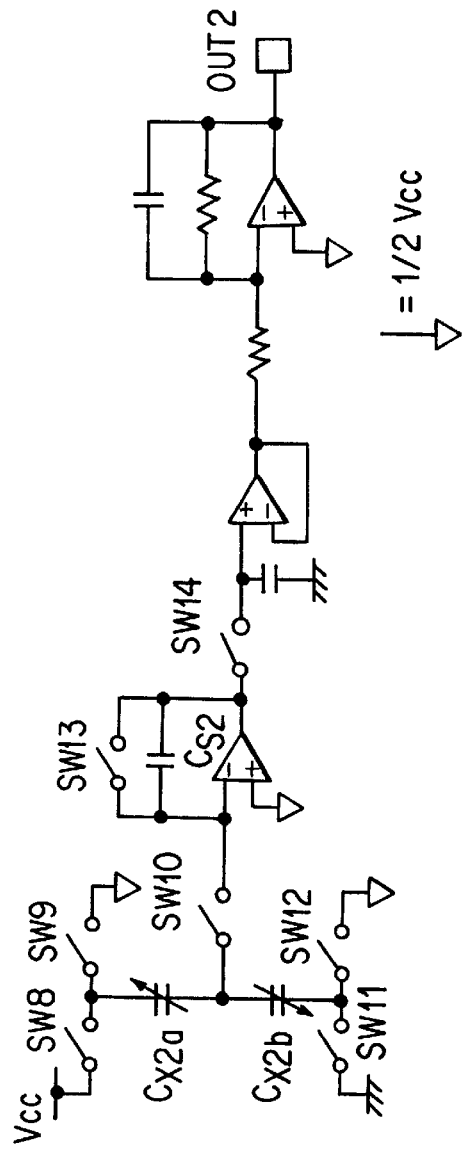

FIG. 5(a) is a circuit diagram illustrating a circuit (OUT1-system circuit) for measuring a capacitance difference between the variable capacitors $C_{X1a}$, $C_{X1b}$. FIG. 5(b) is a circuit diagram illustrating a circuit (OUT2-system circuit) for measuring a capacitance difference between the variable capacitors $C_{X2a}$, $C_{X2b}$. Since the circuit illustrated in FIG. 5(a) is substantially identical to that illustrated in FIG. 5(b), the following description will be made only referring to FIG. 5(a).

This circuit is composed of an electric charge difference detection circuit 18, a sample-hold circuit 20 and an amplifier circuit 22. The electric charge difference detection circuit 18 stores electric charges corresponding to a difference between those stored in the variable capacitor $C_{X1a}$ and those stored in the variable capacitor $C_{X1b}$ into a capacitor $C_{S1}$. The variable capacitors $C_{X1a}$, $C_{X1b}$ are connected in series between $V_{CC}$ and the ground. The first outer electrode 16b constituting the variable capacitor $C_{X1a}$ is connected to $V_{CC}$ via a switch $_{sw1}$, and it is connected to ½$V_{CC}$ via a switch $_{sw2}$. The second outer electrode 16c constituting the variable capacitor $C_{X1b}$ is grounded via a switch $_{sw4}$, and it is connected to ½$V_{CC}$ via a switch $_{sw5}$. The outer common electrode 14b constituting the variable capacitors $C_{X1a}$, $C_{X1b}$ are connected to an input of a switch $_{sw3}$.

An output of the switch sw3 is connected to an inversive input terminal of an operational amplifier $A_1$. The capacitor $C_{S1}$ and a switch $_{sw6}$ are connected in parallel between the output of the switch $_{sw3}$ and an output of the operational amplifier $A_1$. A non-inversive input terminal of the operational amplifier $A_1$ is connected to ½$V_{CC}$.

The sample-hold circuit 20 holds an output voltage corresponding to electric charges stored in the capacitor $C_{S1}$ of the electric charge difference detection circuit 18. That is, an output of a switch $_{sw7}$ is connected to a non-inversive input terminal of an operational amplifier $A_2$, and an output of the operational amplifier $A_2$ is connected to an inversive input terminal thereof. The output of the switch $_{sw7}$ is grounded via a capacitor $C_1$.

The amplifier circuit 22 amplifies the voltage held by the sample-hold circuit 20 and outputs it from an OUT1 terminal. That is, the output end of the operational amplifier $A_2$ is connected to an inversive input terminal of an operational amplifier $A_3$ via a resistance $R_1$. A capacitor $C_2$ and a resistance $R_2$ are connected in parallel between an output of the resistance $R_1$ and an output of the operational amplifier $A_3$. A non-inversive input terminal of the operational amplifier $A_3$ is connected to ½$V_{CC}$.

Figure 6A:
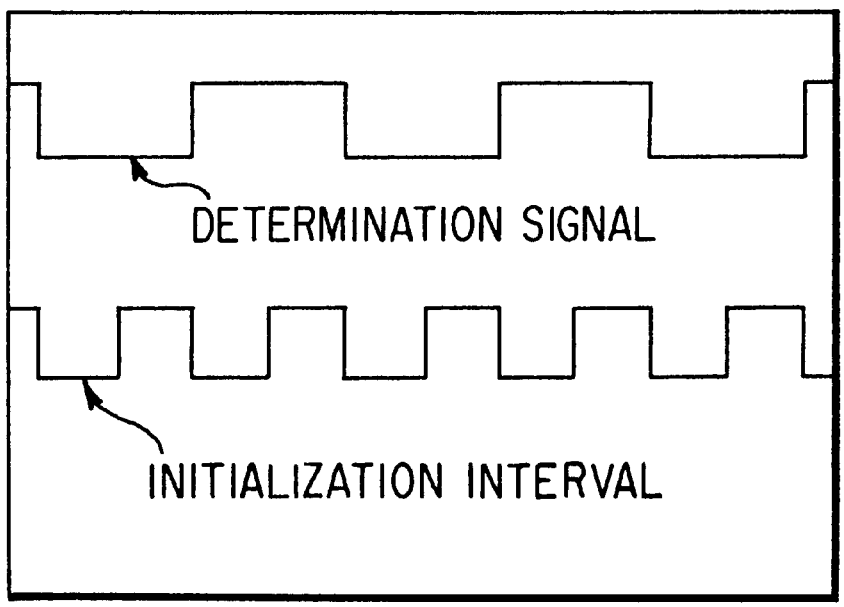
FIG. 6(a) illustrates a determination signal for OUT1- and OUT2-system circuits of the capacitive angle detector of the capacitive angle detector according to the first embodiment.
Figure 6B:
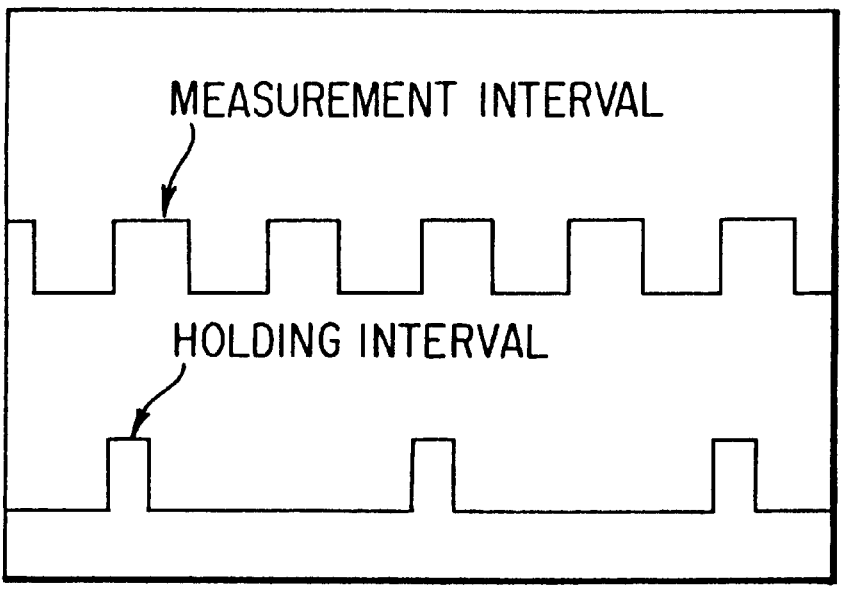
FIG. 6(b) illustrates an initialization interval, a measurement interval and a holding interval in the OUT1- and OUT2-system circuits.

FIG. 6(a) illustrates a determination signal for determining whether to output as a measured value an output from the OUT1-system circuit or an output from the OUT2-system circuit. FIG. 6(b) illustrates an initialization interval, a measurement interval and a holding interval in the OUT1- and OUT2-system circuits.

That is, in the case where the determination signal is on the low level, the output from the OUT1-system circuit is outputted as a measured value. In the case where the determination signal is on the high level, the output from the OUT2-system circuit is outputted as a measured value. For the aforementioned both cases, the initialization interval, the measurement interval and the holding interval are provided respectively.

Figure 7:
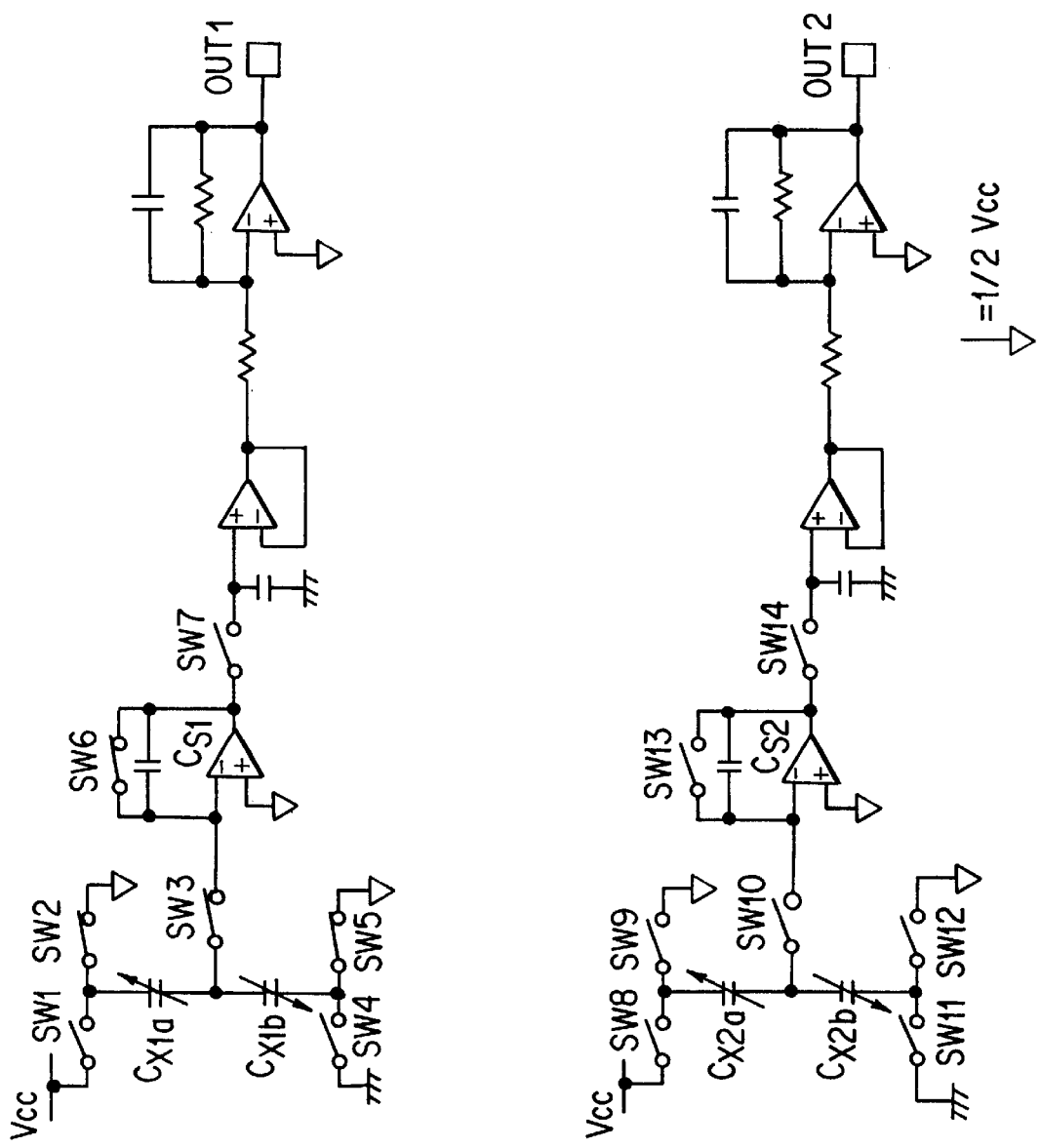
FIG. 7 illustrates operations of switches in the initialization interval of the capacitance difference detecting circuit according to the first embodiment.
Figure 8:
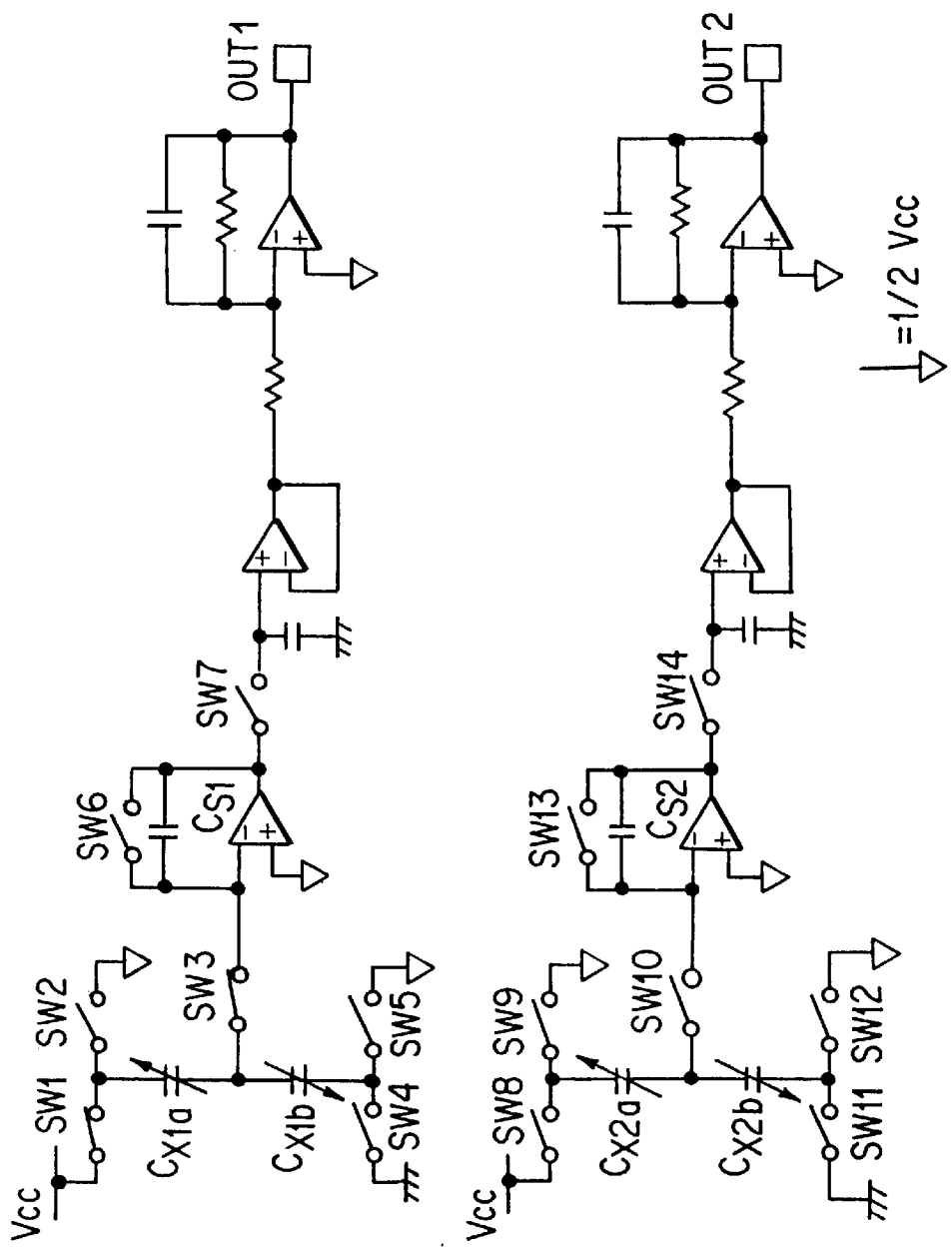
FIG. 8 illustrates operations of the switches in the measurement interval of the capacitance difference detecting circuit according to the first embodiment.
Figure 9:
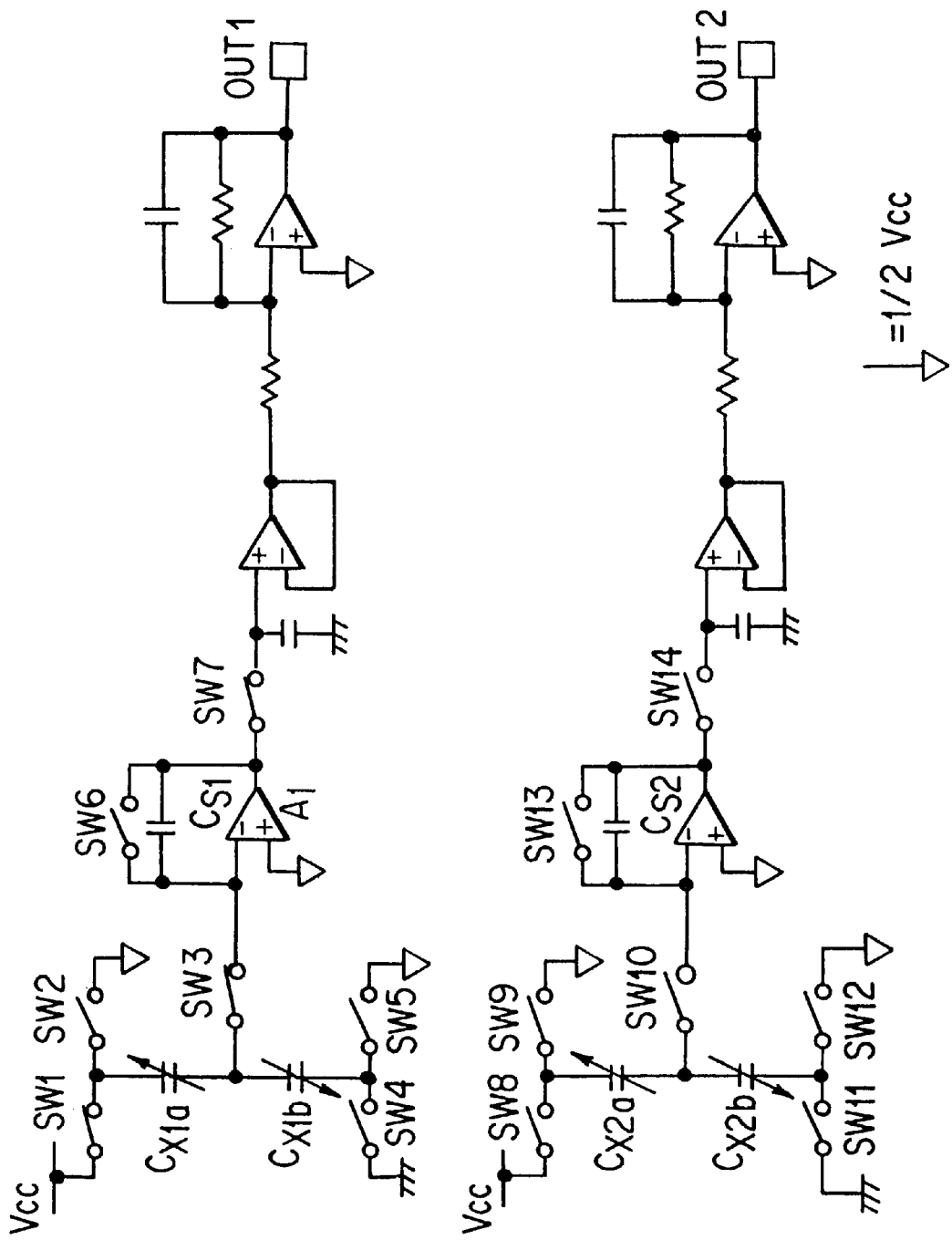
FIG. 9 illustrates operations of the switches in the holding interval of the capacitance difference detecting circuit according to the first embodiment.

FIGS. 7 through 9 illustrate how the respective switches operate in the initialization interval, the measurement interval and the holding interval for the case where the output from the OUT1-system circuit is outputted from the measured value.

When the determination signal is on the low level, that is, in the case where the output from the OUT1-system circuit is outputted as a measured value, the switch $_{sw3}$ is turned ON and a switch $_{sw10}$ is turned OFF. In the initialization interval, the switches $_{sw2}$, $_{sw5}$, $_{sw6}$ are turned ON as illustrated in FIG. 7. Hence, the electric charges stored in the variable capacitors $C_{X1a}$, $C_{X1b}$ and the capacitor $C_{S1}$ are discharged, which achieves the initializing process.

In the measuring interval, as illustrated in FIG. 8, the switches $_{sw2}$, $_{sw5}$, $_{sw6}$ are turned OFF, and $V_{CC}$ is applied to the variable capacitors $C_{X1a}$, $C_{X1b}$. Hence, electric charges corresponding to a difference between those stored in the variable capacitor $C_{X1a}$ and those stored in the variable capacitor $C_{X1b}$ are stored into the capacitor $C_{S1}$.

In the holding interval, the output from the operational amplifier $A_1$ is outputted from the OUT1 terminal by turning the switch $_{sw7}$ ON as illustrated in FIG. 9. When the determination signal is on the high level, the switch $_{sw3}$ is turned OFF and the switch $_{sw10}$ is turned ON. In this case, a measured value is outputted from an OUT2 terminal by operating the switches substantially in the same manner as in the case of the OUT1-system circuit.

The aforementioned operation of the switches is performed every 0.5 msec upon switching-over of the determination signal between the high and low levels. In this case, a measured value $V_A$ of the OUT1-system circuit and a measured value $V_B$ of the OUT2-system circuit are alternately outputted in a time-sharing manner.

While the measurement is conducted in the OUT1-system circuit, a switch $_{sw8}$ and a switch $_{sw11}$ remain turned OFF, so that electric charges are immovable between the variable capacitors $C_{X2a}$, $C_{X2b}$. While the measurement is conducted in the OUT2-system circuit, the switch $_{sw1}$ and the switch $_{sw4}$ remain turned OFF, so that electric charges are immovable between the variable capacitors $C_{X1a}$, $C_{X1b}$.

Figure 10:
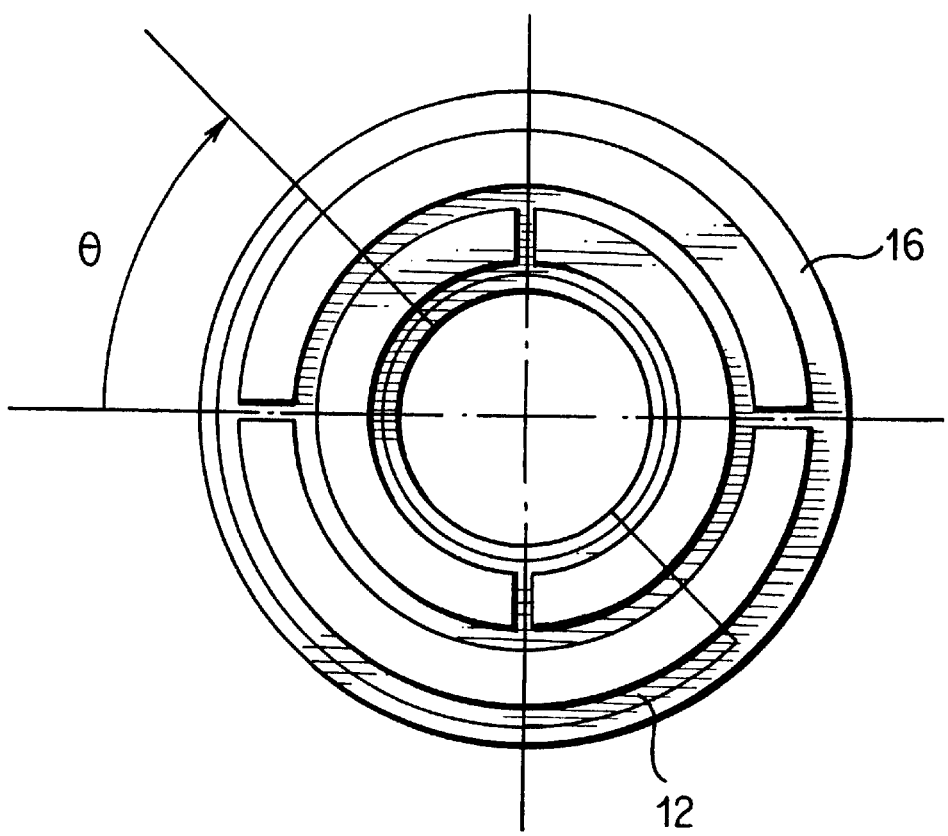
FIG. 10 illustrates a state of the capacitive angle detector according to the first embodiment where a rotating body is offset from the second stationary plate by angle θ.

Referring to FIG. 10, the rotating body 12 is offset by rotating angle θ from the second stationary plate 16 in a horizontal plane. In this case, the area of the rotating body 12 facing the second outer electrode 16c increases, so that the capacitance of the variable capacitor $C_{X1b}$ increases in proportion to the rotating angle. The area of the rotating body facing the first outer electrode 16b decreases, so that the capacitance of the variable capacitor $C_{X1a}$ decreases in proportion to the rotating angle.

Figure 11:
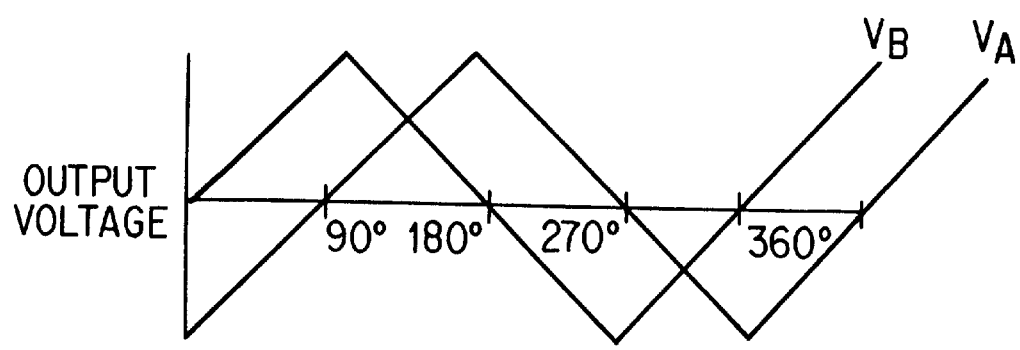
FIG. 11 is a graph illustrating the relationship between a rotating angle θ of the rotating body of the capacitive angle detector according to the first embodiment and measured values $V_A$, $V_B$.

Therefore, the output voltage $V_A$ changes in accordance with a change in the rotating angle θ. As shown in FIG. 11, the output voltage $V_A$ increases linearly in a range from 0° to 180°, and it decreases linearly in a range from 180° to 360°.

On the other hand, the capacitance values of the variable capacitors $C_{X2a}$, $C_{X2b}$ also change in accordance with a rotating movement of the rotating body 12. However, the variable capacitors $C_{X2a}$, $C_{X2b}$ are offset from the variable capacitors $C_{X1a}$, $C_{X1b}$ by 90°. Hence, the output voltage $V_B$ from the OUT2 terminal is shifted by 90° from the output voltage $V_A$ as illustrated in FIG. 11.

In the capacitive angle detector 2 of the first embodiment, the rotating body 12 is made of a dielectric material, and hence the rotating body 12 does not cause capacitive coupling. In addition, electrical charges stored in the capacitors irrelevant to measurement are immovable. It is thus possible to prevent electric charges stored in the other capacitors irrelevant to measurement from affecting the capacitors relevant to measurement. Accordingly, based on the measured values $V_A$, $V_B$ that are phase-shifted from each other by 90°, it is possible to detect an angle precisely in the whole range of 360°.

Although the rotating body 12 is made of a dielectric material in this embodiment, the rotating body 12 may also be made of a conductive metal material. The conductive rotating body provides substantially the same effects as the dielectric rotating body.

A capacitive angle detector 4 according to a second embodiment of the present invention will now be described with reference to FIGS. 12 through 19. The components having the same construction as in the first embodiment will be denoted by the same reference numerals and will not be described in detail.

Figure 12:
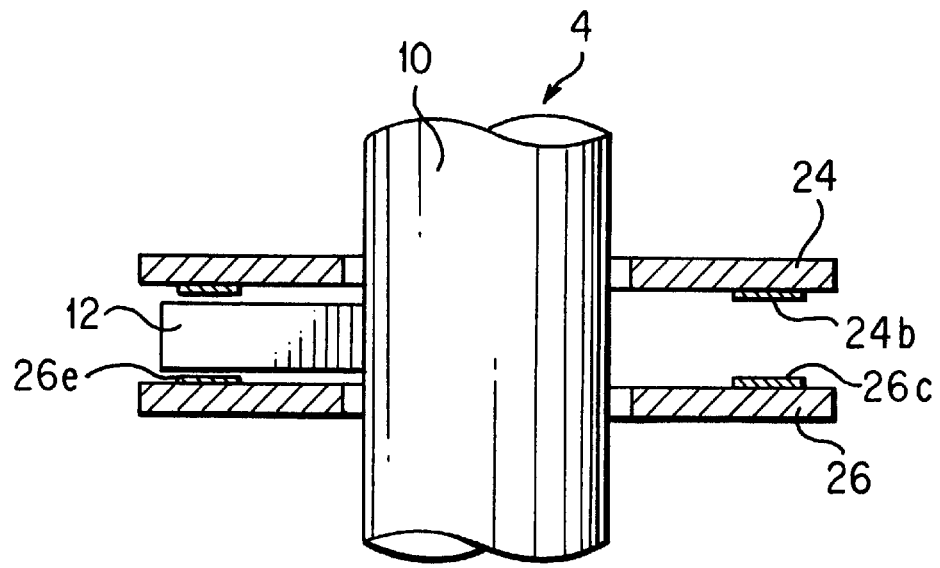
FIG. 12 is a schematic view of a capacitive angle detector according to a second embodiment.
Figure 13:
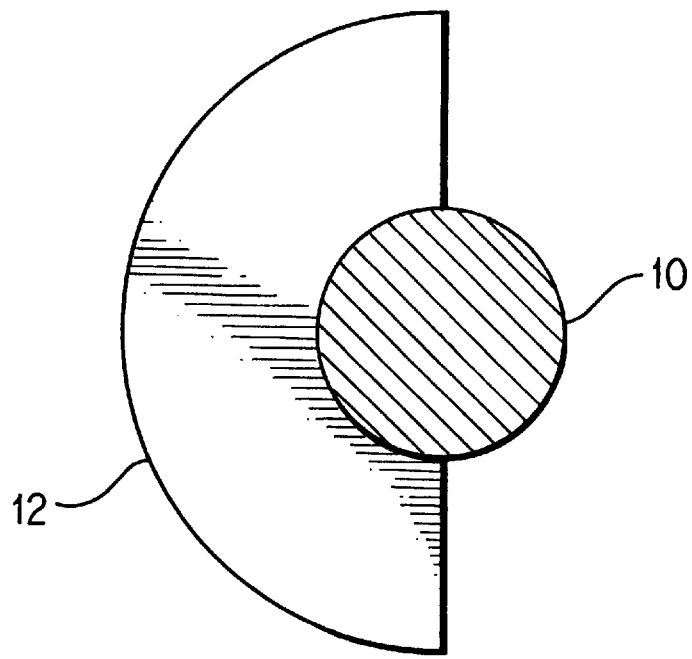
FIG. 13 is a plan view of a rotating body of the capacitive angle detector according to the second embodiment.

As shown in FIG. 12, this capacitive angle detector 4 includes the rotating body 12 attached to the rotating shaft 10 and rotating together therewith, a first stationary plate 24 spaced apart upward from the rotating body 12 by a predetermined distance, and a second stationary plate 26 spaced apart downward from the rotating body 12 by a predetermined distance.

The rotating body 12 has a semicircular shape and is made of a dielectric material. This rotating body 12 is substantially identical to the rotating body 12 of the first embodiment.

Figure 14:
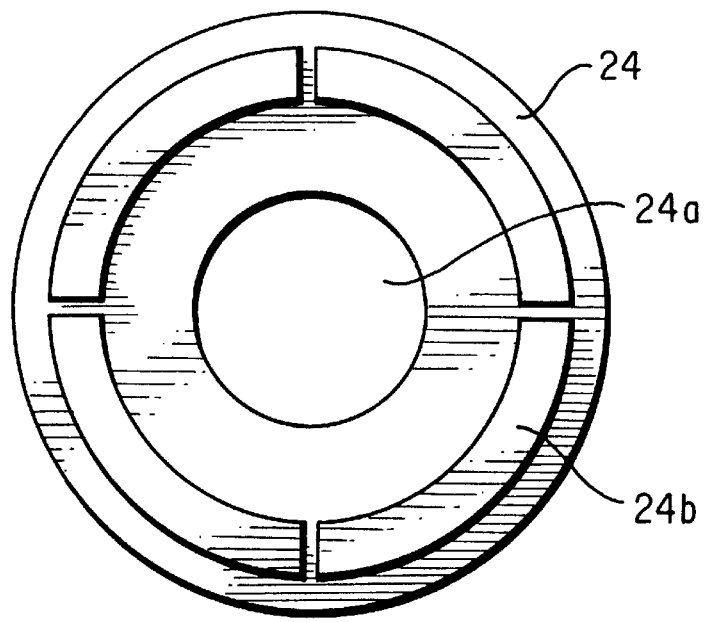
FIG. 14 illustrates a back surface of a first stationary plate of the capacitive angle detector according to the second embodiment.

As shown in FIG. 14, the first stationary plate 24 is a disk member. This disk member has in a central portion thereof a through opening 24a through which the rotating shaft 10 is rotatably passed. The first stationary plate 24 has on a back surface thereof a ring-shaped electrode 24b having a predetermined width. The ring-shaped electrode 24b is arranged to face the rotating body 12.

Figure 15:
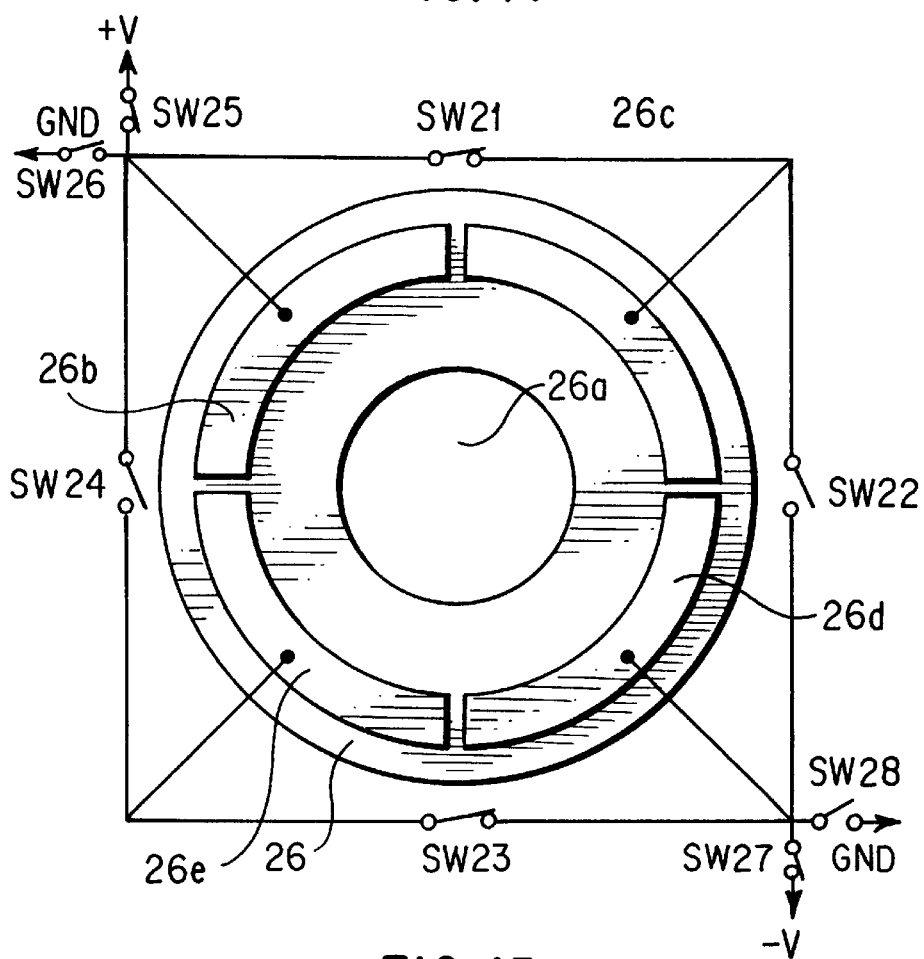
FIG. 15 is a plan view of a second stationary plate of the capacitive angle detector according to the second embodiment.

As shown in FIG. 15, the second stationary plate 26 is a disk member. This disk member has in a central portion thereof a through opening 26a through which the rotating shaft 10 is rotatably passed. The second stationary plate 26 has on a front face thereof a first electrode 26b, a second electrode 26c, a third electrode 26d and a fourth electrode 26e. These electrodes are obtained by quarter-dividing a ring-shaped electrode and arranged to face the rotating body 12 and the ring-shaped electrode 24b on the first stationary plate 24.

As shown in FIG. 12, the first and second stationary plates 24, 26 are arranged parallel to each other and spaced apart from each other by a predetermined distance. Thus, the ring-shaped electrode 24b and the first electrode 26b constitute a variable capacitor $C_{11}$, the ring-shaped electrode 24b and the second electrode 26c a variable capacitor $C_{12}$, the ring-shaped electrode 24b and the third electrode 26d a variable capacitor $C_{13}$, and the ring-shaped electrode 24b and the fourth electrode 26e a variable capacitor $C_{14}$ respectively.

Figure 16:
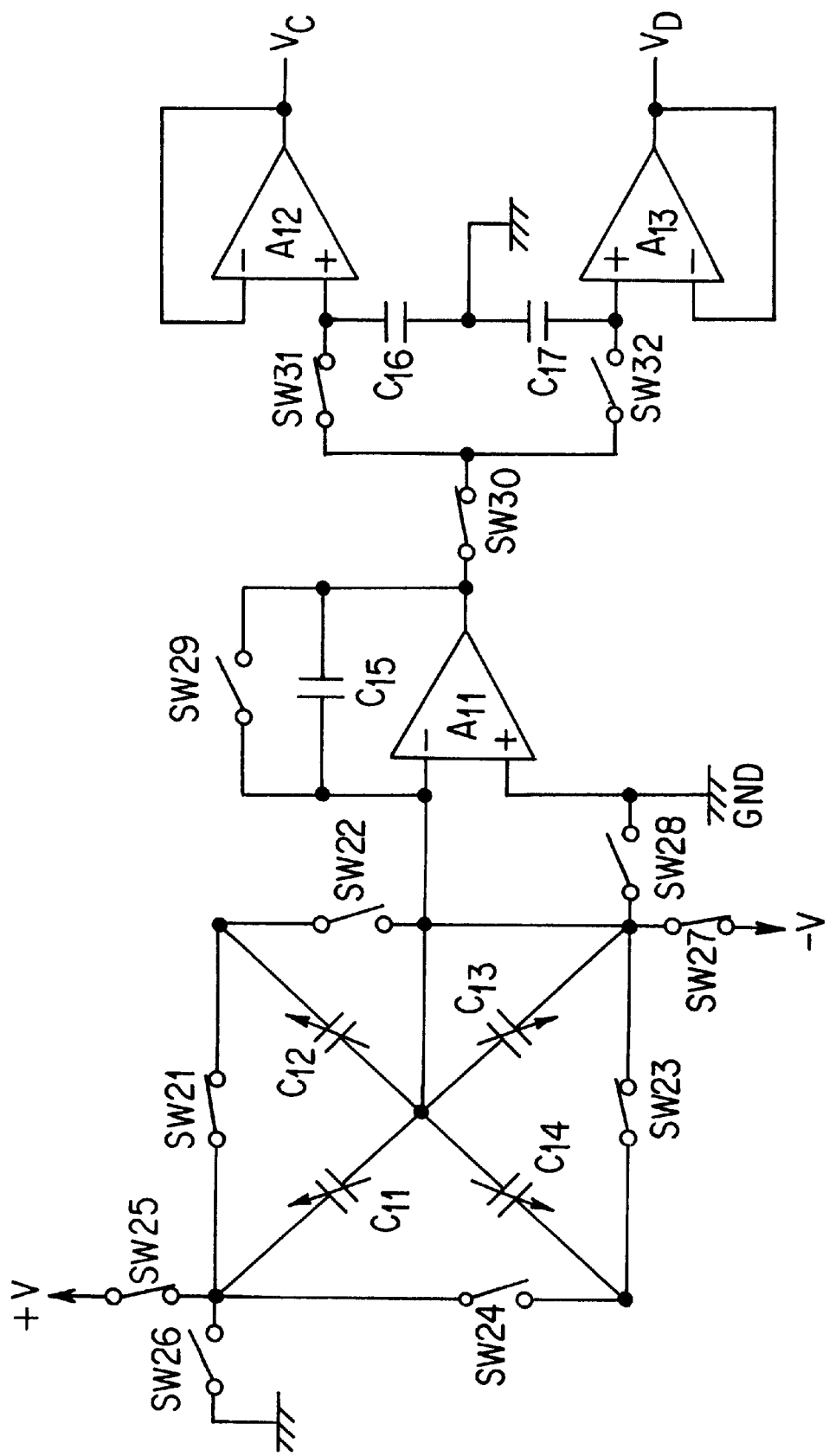
FIG. 16 is a circuit diagram of a circuit for measuring capacitance values of capacitors of the capacitive angle detector according to the second embodiment.
Figure 17:
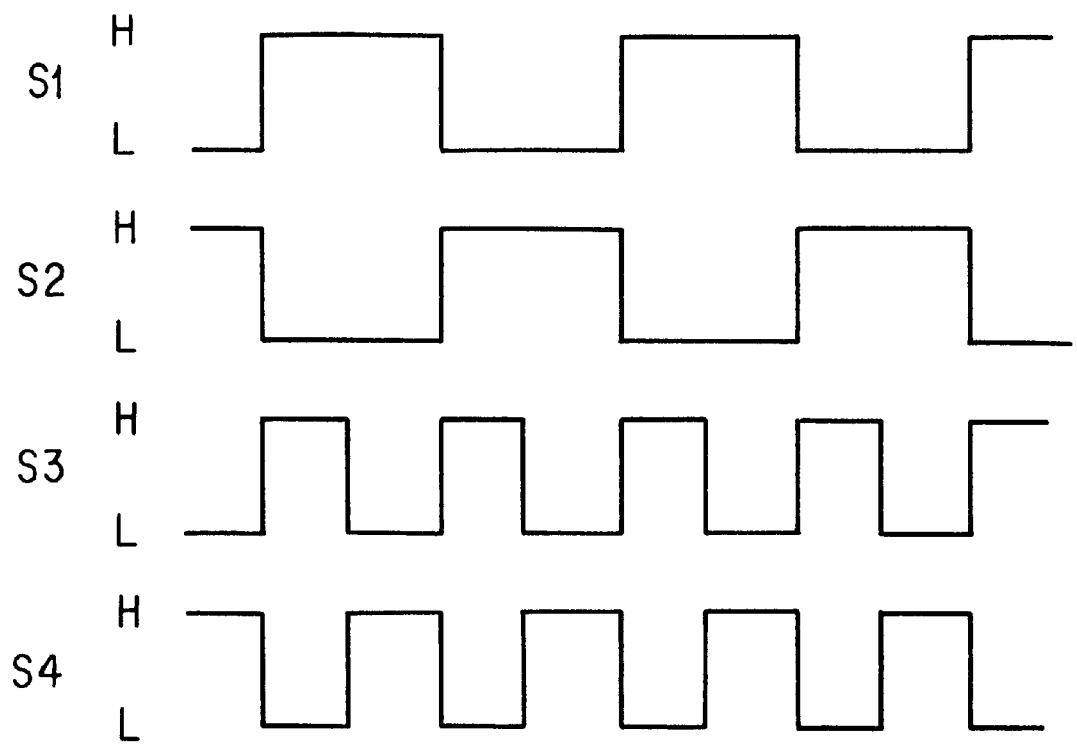
FIG. 17 illustrates timing signals for controlling switches of the circuit for measuring capacitance values of the capacitors of the capacitive angle detector according to the second embodiment.

FIG. 16 illustrates a circuit called a switched capacitor, which detects capacitance values of the variable capacitors $C_{11}$ through $C_{14}$. This circuit is provided with switches $_{sw21}$ through $_{sw32}$ for electronically opening and closing the circuit. The opening and closing of the circuit can be controlled by timing signals S1 through S4 as illustrated in FIG. 17.

Each of the switches $_{sw21}$ through $_{sw32}$ is closed (ON) when a control signal thereof is on the high (H) level, and opened (OFF) when a control signal thereof is on the low (L) level. The relationship between the ON/OFF states of the switches $_{sw21}$ through $_{sw32}$ and the control signals is given in Table 1. Operational amplifiers $A_{11}$, $A_{12}$, $A_{13}$, whose input is composed of an FET, a CMOS or the like, have an extremely great input impedance. A stationary capacitor $C_{15}$ constitutes together with the operational amplifier $A_{11}$ a feedback system. The capacitors $C_{16}$, $C_{17}$ constructed as a holding capacitor constitute together with operational amplifiers $A_{12}$, $A_{13}$ sample-hold circuits respectively.

TABLE 1

| Switch symbol | sw21 | sw22 | sw23 | sw24 | sw25 | sw26 |
|---|---|---|---|---|---|---|
| Control signal | S1 | S2 | S1 | S2 | S4 | S3 |
| C-phase initialization | ON | OFF | ON | OFF | OFF | ON |
| C-phase detection | ON | OFF | ON | OFF | ON | OFF |
| D-phase initialization | OFF | ON | OFF | ON | OFF | ON |
| D-phase detection | OFF | ON | OFF | ON | ON | OFF |

| Switch symbol | sw27 | sw28 | sw29 | sw30 | sw31 | sw32 |
|---|---|---|---|---|---|---|
| Control signal | S4 | S3 | S3 | S4 | S1 | S2 |
| C-phase initialization | OFF | ON | ON | OFF | ON | OFF |
| C-phase detection | ON | OFF | OFF | ON | ON | OFF |
| D-phase initialization | OFF | ON | ON | OFF | OFF | ON |
| D-phase detection | ON | OFF | OFF | ON | OFF | ON |

Figure 18:
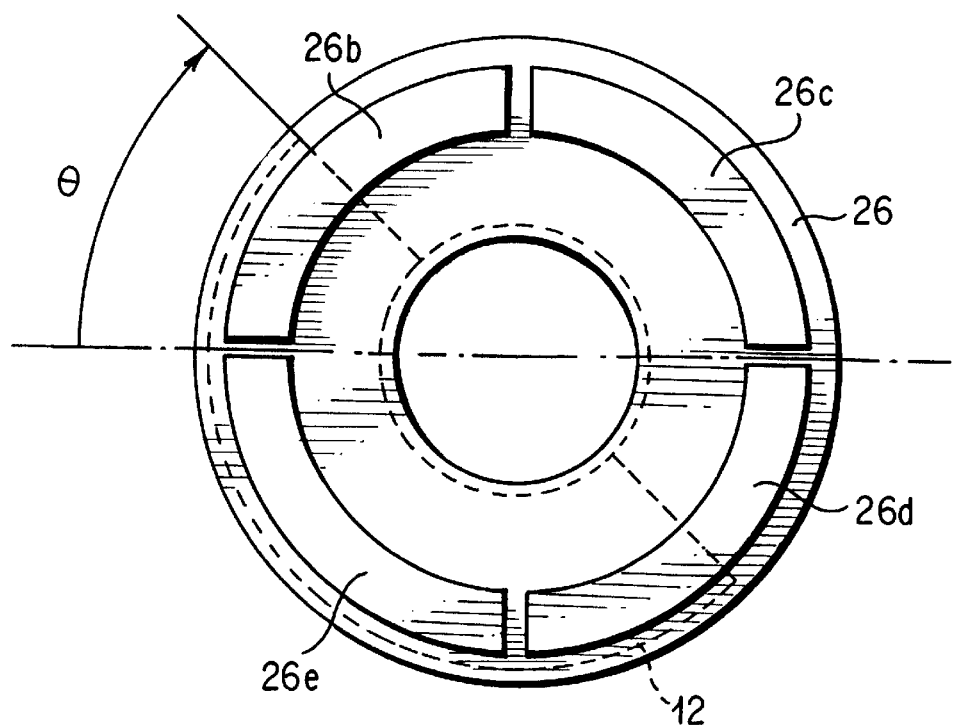
FIG. 18 illustrates a state of the capacitive angle detector according to the second embodiment where a rotating body is offset from the second stationary plate by angle θ.

The capacitive angle detector 4 operates as follows. When the rotating body 12 to which the rotating shaft 10 is attached rotates, the capacitance values of the variable capacitors $C_{11}$, $C_{12}$, $C_{13}$, $C_{14}$ constituted by the respective electrodes change in accordance with respective areas of the variable capacitors facing the rotating body 12. For example, when the rotating body 12 enters an area above the first electrode 26b by rotating clockwise in a horizontal plane by an angle θ as illustrated in FIG. 18, the area of the rotating body 12 facing the first electrode 26b increases. Hence, the capacitance sum (C11+C12) of the variable capacitors $C_{11}$, $C_{12}$ increases in proportion to a rotating angle of the rotating body 12. In this case, the area of the rotating body 12 facing the third electrode 26d decreases. Hence, the capacitance sum (C13+C14) of the variable capacitors $C_{13}$, $C_{14}$ decreases in proportion to a rotating angle of the rotating body 12.

On the other hand, the capacitance sum (C11+C14) of the variable capacitors $C_{11}$, $C_{14}$ and the capacitance sum (C12+C13) of the variable capacitors $C_{12}$, $C_{13}$ also change in accordance with a rotating movement of the rotating body 12. However, a dividing line between the variable capacitors $C_{11}$, $C_{12}$ and the variable capacitors $C_{13}$, $C_{14}$ is perpendicular to a dividing line between the variable capacitors $C_{11}$, $C_{14}$ and the variable capacitors $C_{12}$, $C_{13}$. Hence, the changes in the capacitance sums (C11+C14), (C12+C13) are phase-shifted by 90° from the changes in the capacitance sums (C11+C12), (C13+C14) respectively.

When the switches $_{sw21}$, $_{sw23}$ and the switches $_{sw22}$, $_{sw24}$ are turned ON and OFF respectively, the circuit as illustrated in FIG. 16 differentially detects the capacitance values (C11+C12), (C13+C14). When the switches $_{sw21}$, $_{sw23}$ and the switches $_{sw22}$, $_{sw24}$ are turned OFF and ON respectively, this circuit differentially detects the capacitance values (C11+C14), (C12+C13).

Namely, as shown in FIG. 17 and Table 1, as soon as the switches $_{sw21}$, $_{sw23}$, $_{sw31}$ and the switches $_{sw22}$, $_{sw24}$, $_{sw32}$ are turned ON and OFF respectively, the switches $_{sw25}$, $_{sw27}$, $_{sw30}$ and the switches $_{sw26}$, $_{sw28}$, $_{sw29}$ are turned OFF and ON respectively. In this state, the variable capacitors $C_{11}$, $C_{12}$, $C_{13}$, $C_{14}$, the capacitor $C_{15}$ and the operational amplifier $A_{11}$ are in a state of being grounded. That is, the input and output voltages of the operational amplifier $A_{11}$ become null, and there are no electric charges stored in the respective capacitors. The variable capacitors $C_{11}$, $C_{12}$, $C_{13}$, $C_{14}$ and the capacitor $C_{15}$ are thus initialized.

When the switches $_{sw25}$, $_{sw27}$, $_{sw30}$ and the switches $_{sw26}$, $_{sw28}$, $_{sw29}$ are turned ON and OFF respectively, the variable capacitors $C_{11}$, $C_{12}$, $C_{13}$, $C_{14}$ and the capacitor $C_{15}$ are charged with electric charges. The operational amplifier $A_{11}$ is then supplied with a voltage corresponding to the capacitance values of the respective capacitors. The output voltage from the operational amplifier $A_{11}$ is applied to a capacitor $C_{16}$.

Since the operational amplifier $A_{12}$ is a so-called voltage follower (with the amplification factor of 1), it outputs the voltage applied to the capacitor $C_{16}$ directly as $V_C$. This output voltage $V_C$ corresponds to capacitance values (C11+C12), (C13+C14) that are differentially detected.

As soon as the switches $_{sw21}$, $_{sw23}$, $_{sw31}$ and the switches $_{sw22}$, $_{sw24}$, $_{sw32}$ are turned OFF and ON respectively, the switches $_{sw25}$, $_{sw27}$, $_{sw30}$ and the switches $_{sw26}$, $_{sw28}$, $_{sw29}$ are turned OFF and ON respectively. In this state, the variable capacitors $C_{11}$, $C_{12}$, $C_{13}$, $C_{14}$, the capacitor $C_{15}$ and the operational amplifier $A_{11}$ are in a state of being grounded. That is, the input and output voltages of the operational amplifier $A_{11}$ become null, and there are no electric charges stored in the respective capacitors. The variable capacitors $C_{11}$, $C_{12}$, $C_{13}$, $C_{14}$ and the capacitor $C_{15}$ are thus initialized.

When the switches $_{sw25}$, $_{sw27}$, $_{sw30}$ and the switches $_{sw26}$, $_{sw28}$, $_{sw29}$ are turned ON and OFF respectively, the variable capacitors $C_{11}$, $C_{12}$, $C_{13}$, $C_{14}$ and the capacitor $C_{15}$ are charged with electric charges. The operational amplifier $A_{11}$ is then supplied with a voltage corresponding to the capacitance values of the respective capacitors. The output voltage from the operational amplifier $A_{11}$ is applied to a capacitor $C_{17}$.

Since the operational amplifier $A_{13}$ is a so-called voltage follower (with the amplification factor of 1), it outputs the voltage applied to the capacitor $C_{17}$ directly as $V_D$. This output voltage $V_D$ corresponds to capacitance values (C11+C14), (C12+C13) that are differentially detected.

In this case, the switch sw31 is turned OFF, and the operational amplifier A12 has an extremely great input impedance (because the input thereof is an FET or a CMOS). Hence, the voltage applied to the capacitor $C_{16}$ is maintained as it is. Accordingly, the operational amplifier $A_{12}$ keeps outputting the voltage that has been detected immediately before. In the aforementioned operation, the output voltages $V_C$, $V_D$ are given as follows.

$$V_C = \frac{\{(C_{13}+C_{14})-(C_{11}+C_{12})\}\cdot V}{C_{15}} = \frac{\varepsilon_0 \cdot S \cdot (90-\theta) \cdot t' \cdot V}{90 \cdot C_{15} \cdot d \cdot (d-t')} \quad \text{[Formula 1]}$$
$$(0° \le \theta \le 180°)$$
$$= \frac{\varepsilon_0 \cdot S \cdot (\theta-270) \cdot t' \cdot V}{90 \cdot C_{15} \cdot d \cdot (d-t')}$$
$$(180° \le \theta \le 360°)$$

$$V_D = \frac{\{(C_{12}+C_{13})-(C_{11}+C_{14})\}\cdot V}{C_{15}} = \frac{\varepsilon_0 \cdot S \cdot \theta \cdot t' \cdot V}{90 \cdot C_{15} \cdot d \cdot (d-t')}$$
$$(0° \le \theta \le 90°)$$
$$= \frac{\varepsilon_0 \cdot S \cdot (180-\theta) \cdot t' \cdot V}{90 \cdot C_{15} \cdot d \cdot (d-t')}$$
$$(90° \le \theta \le 270°)$$
$$= \frac{\varepsilon_0 \cdot S \cdot (\theta-360) \cdot t' \cdot V}{90 \cdot C_{15} \cdot d \cdot (d-t')}$$
$$(270° \le \theta \le 360°)$$

$t' = t(1 - 1/k)$ $V$ : Voltage applied to electrode

-continued $\varepsilon o$ : dielectric constant $k$ : relative dielectric constant $\theta$ : rotating angle $t$ : thickness of the dielectric material $d$ : distance between the first and second
   stationary plates 14, 16

$S$ : area of electrode

Figure 19:
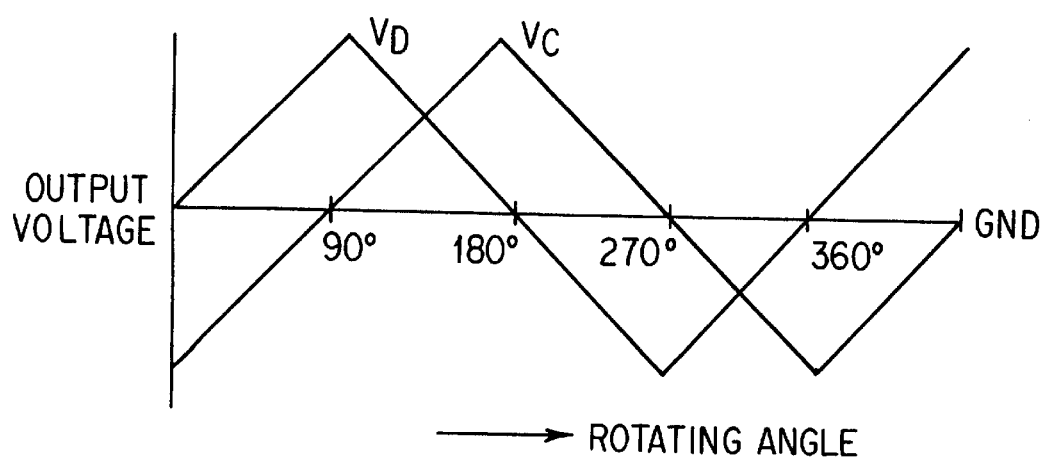
FIG. 19 is a graph illustrating the relationship between a rotating angle θ of the rotating body of the capacitive angle detector according to the second embodiment and measured values $V_c$, $V_D$.

FIG. 19 illustrates measured output voltages $V_C$, $V_D$. The output voltages $V_C$, $V_D$ are phase-shifted from each other by 90°. These two output signals as illustrated in FIG. 19 make it possible to detect an angle in the whole range of 360°. When one of the signals reaches its maximum or minimum level, the detection precision of that signal is low. In this state, however, the other signal is on a level that achieves a high detection precision. By selecting the signal with the higher detection precision, it is possible to detect an angle precisely in the whole range of 360°.

Although the rotating body 12 is also made of a dielectric material in the second embodiment, the rotating body 12 may also be made of a conductive metal material as described in the first embodiment.

A capacitive angle detector 6 according to a third embodiment of the present invention will now be described with reference to FIGS. 20 through 23. The components having the same construction as in the capacitive angle detector 2 of the first embodiment will be denoted by the same reference numerals and will not be described in detail.

This capacitive angle detector 6 includes first through sixth electrodes formed by dividing a power-source electrode into six portions, so that measuring signals of three distinct phases can be outputted.

Figure 20:
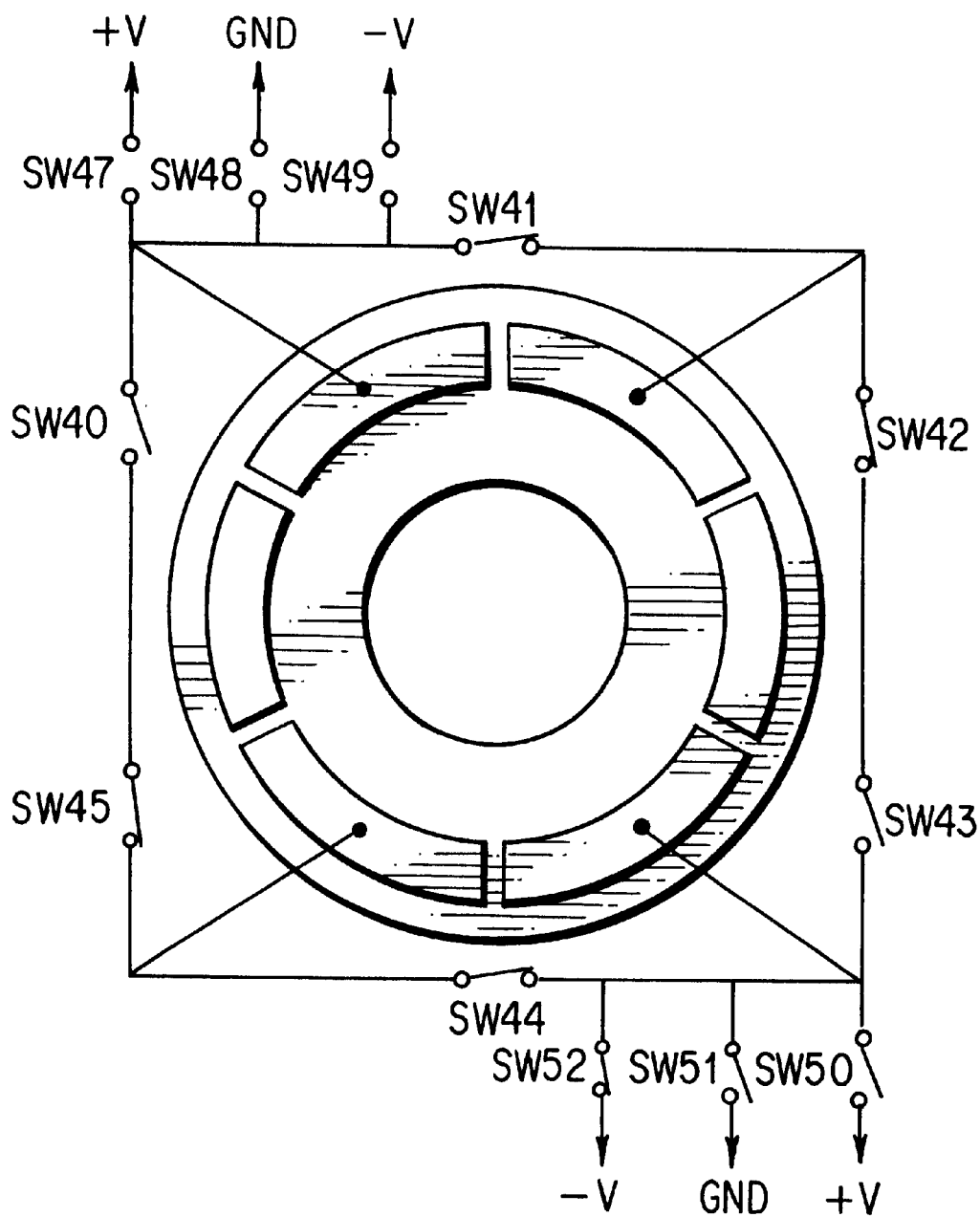
FIG. 20 is a plan view of a second stationary plate of a capacitive angle detector according to a third embodiment.
Figure 21:
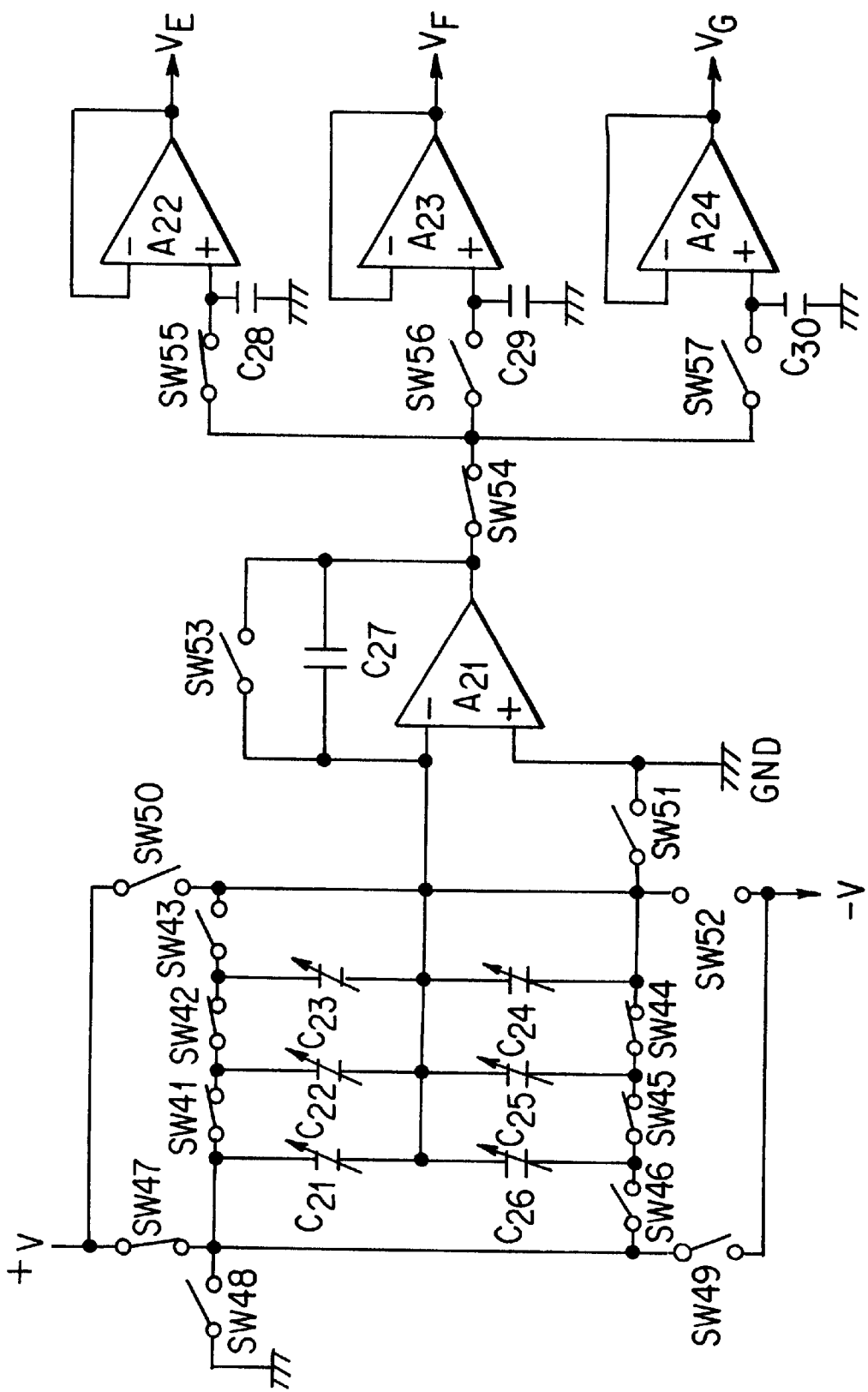
FIG. 21 is a circuit diagram of a circuit for measuring capacitance values of capacitors of the capacitive angle detector according to the third embodiment.
Figure 22:
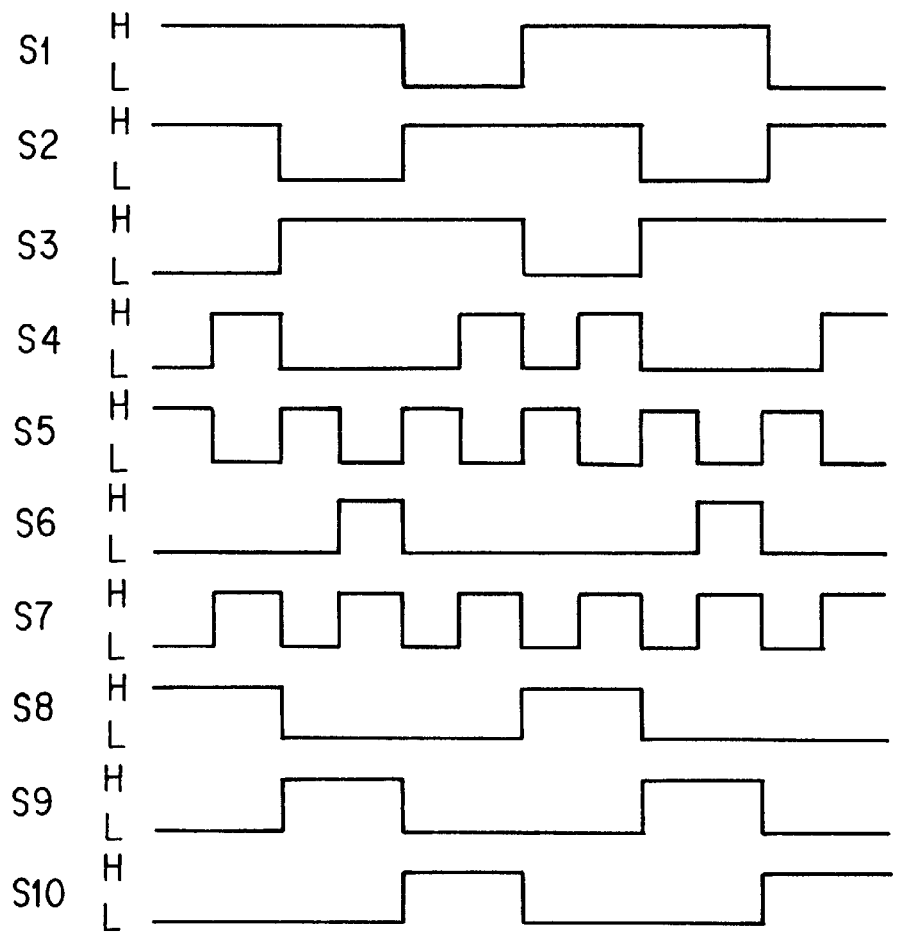
FIG. 22 illustrates timing signals for controlling switches of the circuit for measuring capacitance values of the capacitors of the capacitive angle detector according to the third embodiment.
Figure 23:
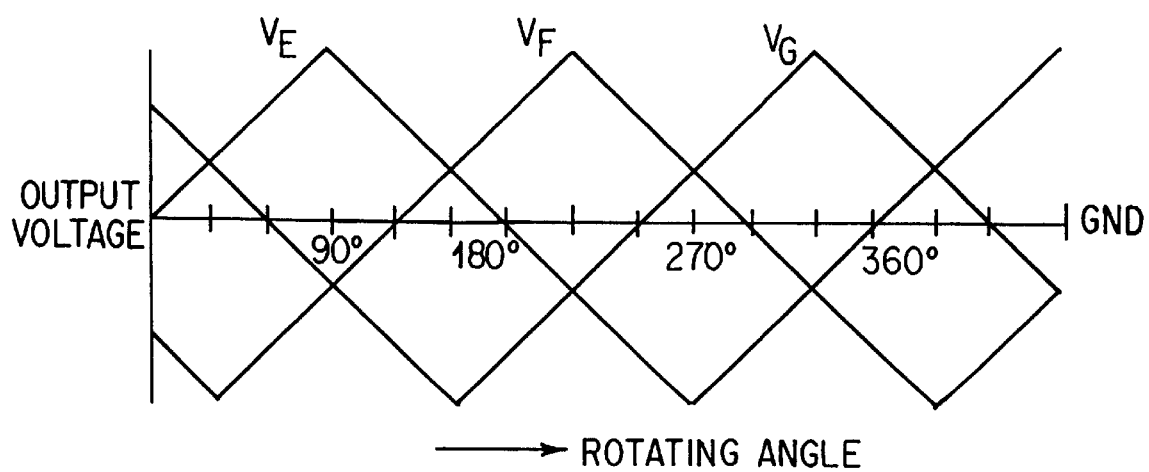
FIG. 23 is a graph illustrating the relationship between a rotating angle θ of a rotating body of the capacitive angle detector according to the third embodiment and measured values $V_E$, $V_F$, $V_G$.

FIG. 20 illustrates the first through sixth electrodes formed on the second stationary plate and the arrangement of switches connected to these electrodes. FIG. 21 illustrates a circuit for detecting capacitance values of capacitors constituted by the respective electrodes. FIG. 22 illustrates control signals S1 through S10 for controlling switches $_{sw41}$ through $_{sw57}$. FIG. 23 illustrates output signals. Furthermore, the relationship between ON/OFF states of the switches $_{sw41}$ through $_{sw57}$ and the control signals is given in Table 2.

TABLE 2

| Switch symbol | sw41 | sw42 | sw43 | sw44 | sw45 | sw46 |
|---|---|---|---|---|---|---|
| Control signal | S1 | S2 | S3 | S1 | S2 | S3 |
| E-phase initialization | ON | ON | OFF | ON | ON | OFF |
| E-phase detection | ON | ON | OFF | ON | ON | OFF |
| F-phase initialization | ON | OFF | ON | ON | OFF | ON |
| F-phase detection | ON | OFF | ON | ON | OFF | ON |
| G-phase initialization | OFF | ON | ON | OFF | ON | ON |
| G-phase detection | OFF | ON | ON | OFF | ON | ON |
| Switch symbol | sw47 | sw48 | sw49 | sw50 | sw51 | sw52 |
| Control signal | S4 | S5 | S6 | S6 | S5 | S4 |
| E-phase initialization | OFF | ON | OFF | OFF | ON | OFF |
| E-phase detection | ON | OFF | OFF | OFF | OFF | ON |
| F-phase initialization | OFF | ON | OFF | OFF | ON | OFF |
| F-phase detection | OFF | OFF | ON | ON | OFF | OFF |
| G-phase initialization | OFF | ON | OFF | OFF | ON | OFF |
| G-phase detection | ON | OFF | OFF | OFF | OFF | ON |

TABLE 2-continued

| Switch symbol | sw53 | sw54 | sw55 | sw56 | sw57 |
|---|---|---|---|---|---|
| Control signal | S5 | S7 | S8 | S9 | S10 |
| E-phase initialization | ON | OFF | ON | OFF | OFF |
| E-phase detection | OFF | ON | ON | OFF | OFF |
| F-phase initialization | ON | OFF | OFF | ON | OFF |
| F-phase detection | OFF | ON | OFF | ON | OFF |
| G-phase initialization | ON | OFF | OFF | OFF | ON |
| G-phase detection | OFF | ON | OFF | OFF | ON |

The capacitive angle detector 6 operates substantially in the same manner as the capacitive angle detector 4 of the second embodiment. Hence, the operation of the capacitive angle detector 6 will not be described. As shown in FIG. 23, this capacitive angle detector 6 outputs three signals $V_E$, $V_F$, $V_G$ that are phase-shifted from each other by 120°.

This capacitive angle detector 6 enables the detection of a rotating angle in the whole range of 360° by outputting the signals having three distinct phases. By selectively using high-precision portions of the respective signals, the capacitive angle detector 6 is able to detect an angle even more precisely than the capacitive angle detector 4 of the second embodiment.

A capacitive angle detector 8 according to a fourth embodiment of the present invention will now be described with reference to FIGS. 24 through 33. The components having the same construction as in the capacitive angle detector 2 of the first embodiment will be denoted by the same reference numerals and will not be described in detail.

Figure 24:
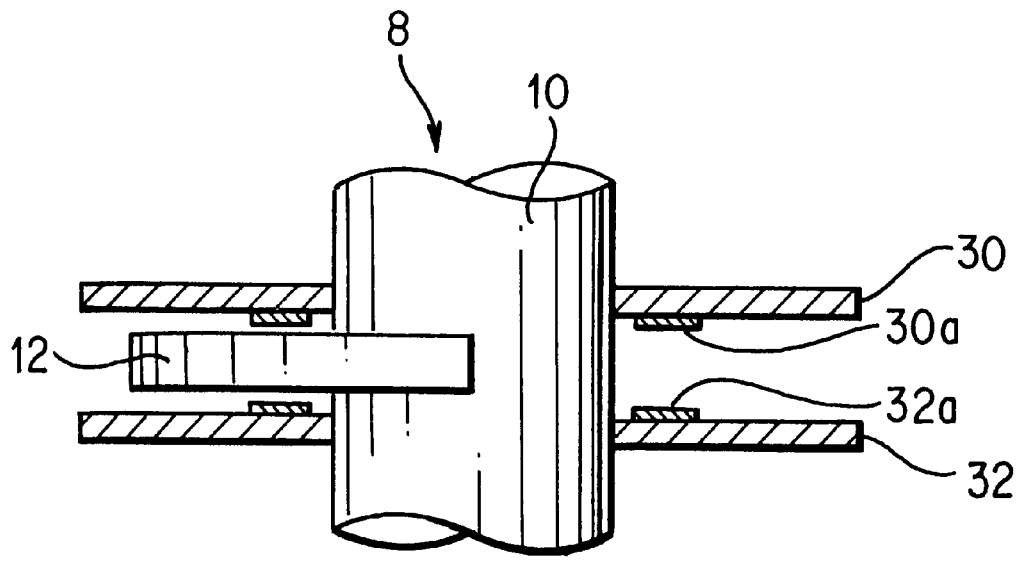
FIG. 24 is a schematic view of a capacitive angle detector according to a fourth embodiment.

As shown in FIG. 24, this capacitive angle detector 8 includes the rotating body 12 attached to the rotating shaft 10 and rotating together therewith, a first stationary plate 30 spaced apart upward from the rotating body 12 by a predetermined distance, and a second stationary plate 32 spaced apart downward from the rotating body 12 by a predetermined distance.

Figure 25:
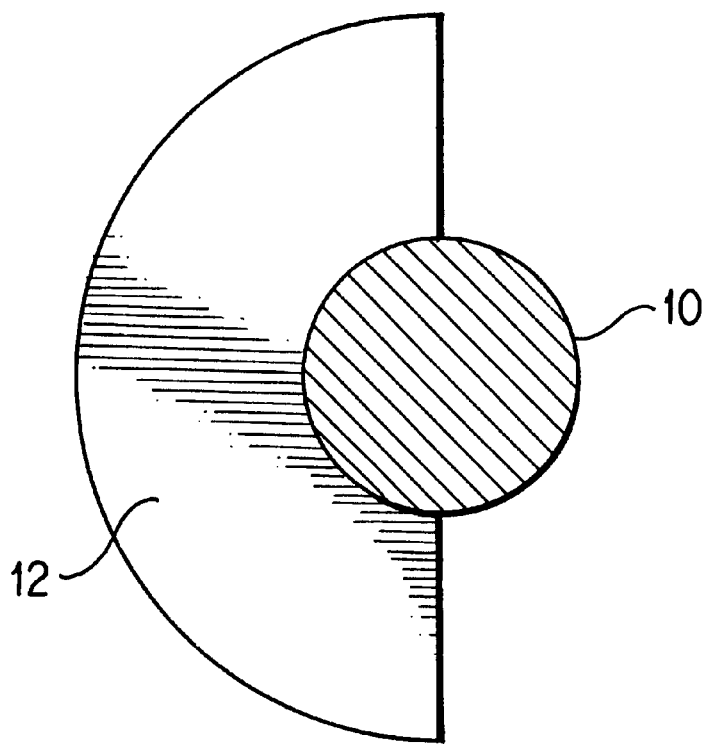
FIG. 25 is a plan view of a rotating body of the capacitive angle detector according to the fourth embodiment.

The rotating body 12 has a semicircular shape as illustrated in FIG. 25 and is made of a dielectric material. This rotating body 12 is substantially identical to the rotating body 12 of the first embodiment.

Figure 26:
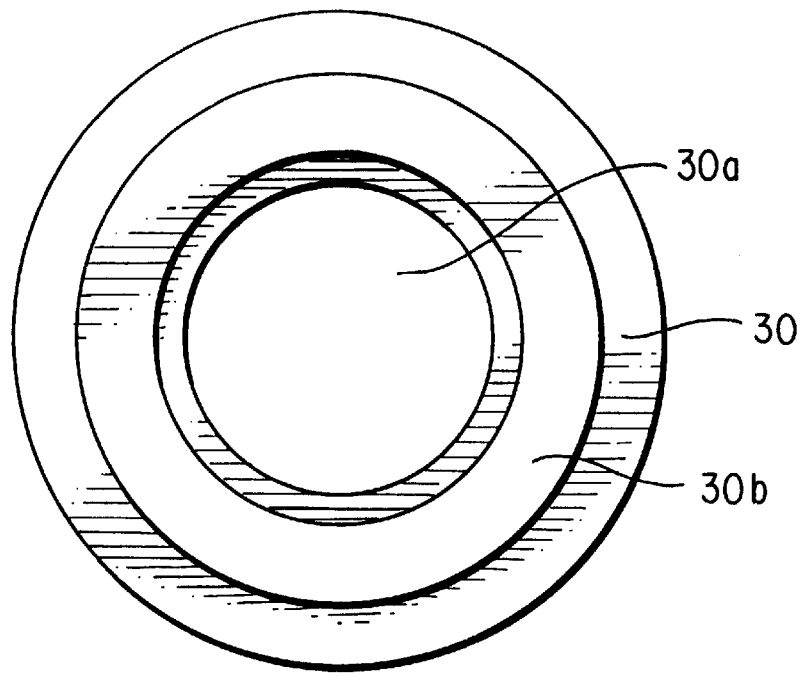
FIG. 26 illustrates a back surface of a first stationary plate of the capacitive angle detector according to the fourth embodiment.

As shown in FIG. 26, the first stationary plate 30 is a disk member. This disk member has in a central portion thereof a through opening 30a through which the rotating shaft 10 is passed. The first stationary plate 30 has on a back surface thereof a ring-shaped electrode 30b having a predetermined width. The ring-shaped electrode 30b is arranged to face the rotating body 12.

Figure 27:
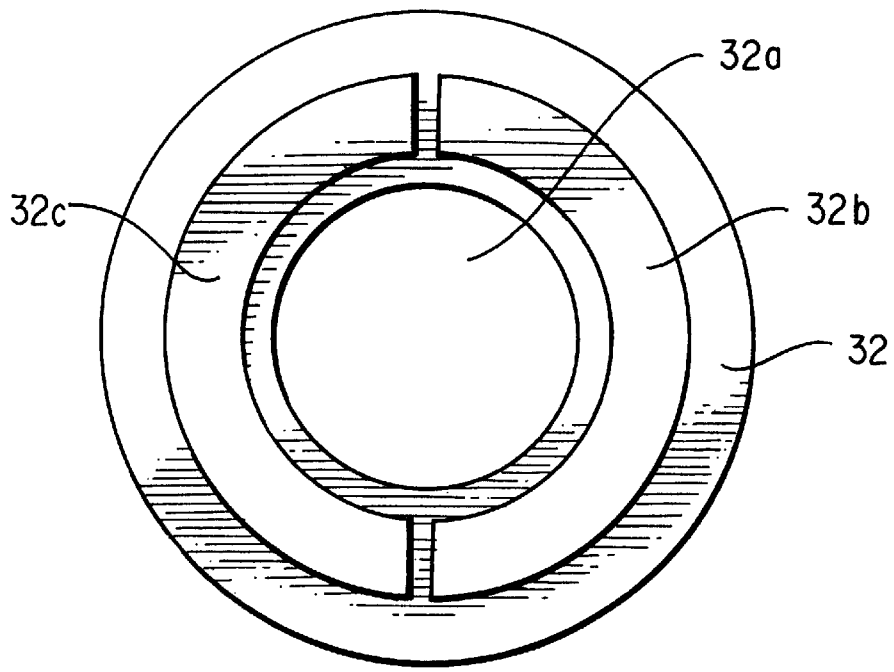
FIG. 27 is a plan view of a second stationary plate of the capacitive angle detector according to the fourth embodiment.

As shown in FIG. 27, the second stationary plate 32 is a disk member. This disk member has in a central portion thereof a through opening 32a through which the rotating shaft 10 is passed. The second stationary plate 32 has on a front face thereof a first electrode 32b and a second electrode 32c. These electrodes are obtained by half-dividing a ring-shaped electrode and arranged to face the rotating body 12 and the ring-shaped electrode 30b on the first stationary plate 30.

As shown in FIG. 24, the first and second stationary plates 30, 32 are arranged parallel to each other and spaced apart from each other by a predetermined distance. Thus, the ring-shaped electrode 30b and the first electrode 32b constitute a variable capacitor $C_{41}$, and the ring-shaped electrode 30b and the second electrode 32c constitute a variable capacitor $C_{42}$.

Figure 28:
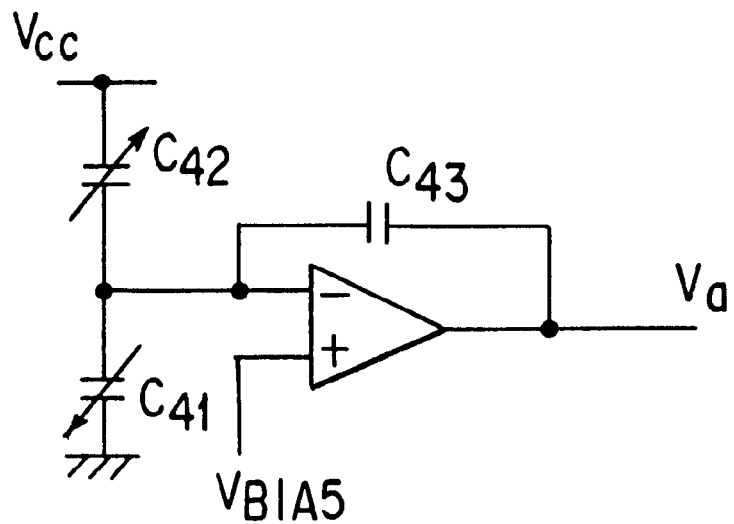
FIG. 28 is a circuit diagram of a capacitance difference detecting circuit for detecting a difference in capacitance among capacitors of the capacitive angle detector according to the fourth embodiment.

FIG. 28 is a circuit diagram illustrating a circuit for detecting a difference in capacitance between the variable capacitors $C_{41}$, $C_{42}$. This circuit stores electric charges corresponding to a difference between those stored in the variable capacitor $C_{41}$ and those stored in the variable capacitor $C_{42}$ into a reference capacitor, namely, a capacitor $C_{43}$, thereby outputting a voltage $V_0$. The variable capacitors $C_{41}$, $C_{42}$ are connected in series between $V_{CC}$ and the ground.

Figure 29:
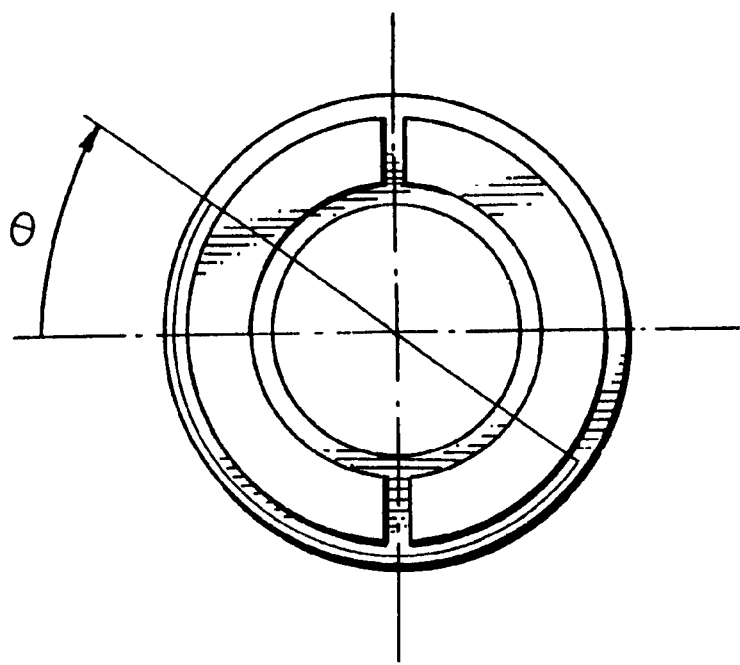
FIG. 29 illustrates a state of the capacitive angle detector according to the fourth embodiment where the rotating body is offset from the second stationary plate by angle θ.
Figure 30:
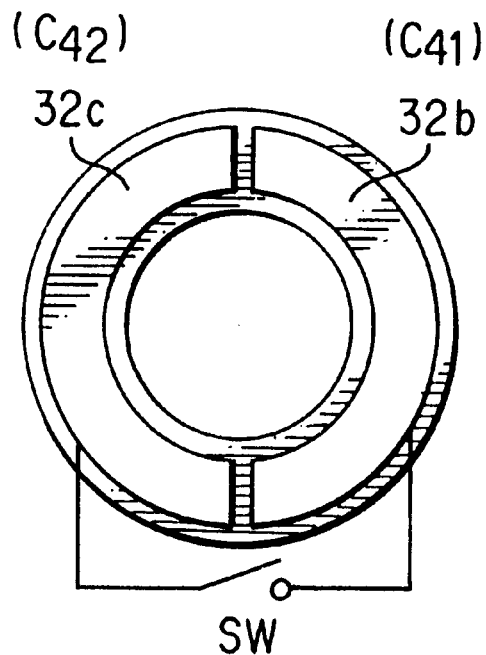
FIG. 30 illustrates a state where electrodes of the capacitors constituting the capacitive angle detector are connected.

In the case where the rotating body 12 is offset by angle θ as illustrated in FIG. 29, the capacitance values of the variable capacitors $C_{41}$, $C_{42}$ and the voltage $V_0$ based on the difference in capacitance between the variable capacitors $C_{41}$, $C_{42}$ are calculated respectively from Formula 2.

$$V_0 = \frac{(C_{41} - C_{42})V_{CC}}{2C_{43}} + \frac{V_{CC}}{2} \quad \text{[Formula 2]}$$

$$C_{41} = \frac{e_0 S}{d} \cdot \{1 + ((90 - \theta)/180) \cdot (t'/(d - t'))\}$$

$$C_{42} = \frac{e_0 S}{d} \cdot \{1 + ((90 + \theta)/180) \cdot (t'/(d - t'))\}$$

$$t' = t(1 - 1/k)$$

$C_{41}$ : capacitance of rotation detecting portion $C_{42}$ : capacitance of rotation detecting portion $C_{43}$ : capacitance of reference $V_{CC}$ : voltage applied to electrode $e_0$ : dielectric constant $S$ : area of electrode $d$ : distance between the first and second stationary plates In the aforementioned circuit as illustrated in FIG. 28, while the variable capacitors $C_{41}$, $C_{42}$ are formed using the rotating body 12 made of a dielectric material, the capacitor C43 is arranged inside IC in order to reduce the overall dimension and eliminate errors resulting from leakage current. Hence, the temperature coefficient of the variable capacitors $C_{41}$, $C_{42}$ is different from that of the capacitor $C_{43}$, so that the sensitivity in detecting an angle is temperature-dependent. Accordingly, this capacitive angle detector 8 is provided with a feedback circuit for correcting the sensitivity at a predetermined timing.

Figure 31:
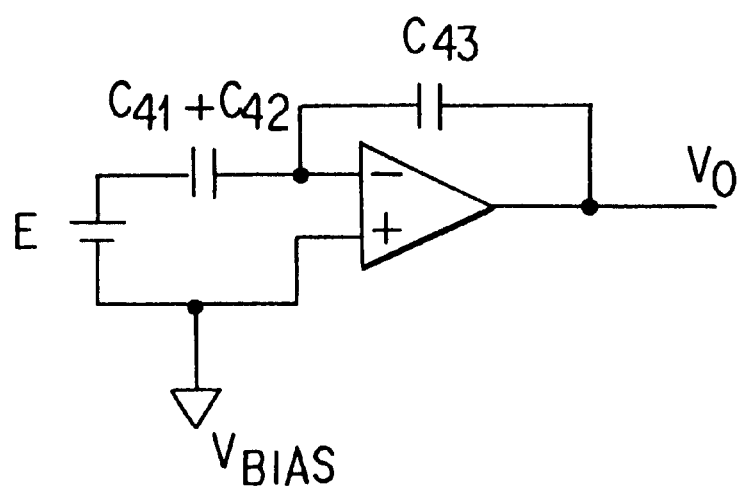
FIG. 31 is a circuit diagram of a circuit where the electrodes of the capacitors constituting the capacitive angle detector are connected.

That is, the first and second electrodes 32b, 32c constituting the variable capacitors $C_{41}$, $C_{42}$ respectively are connected to complete a circuit as illustrated in FIG. 31. In this circuit as illustrated in FIG. 31, the capacitance sum $C_0$ of the variable capacitors $C_{41}$, $C_{42}$ is constant as indicated by Formula 3. In this case, the voltage change corresponding to capacitance changes of the variable capacitors $C_{41}$, $C_{42}$ is represented by $\Delta V_0$.

$$C_{41} + C_{42} = \frac{e_0 S}{d} \cdot \{2 + (t'/(d - t'))\} = C_0 \quad \text{[Formula 3]}$$

$$\Delta V_0 \cdot 2C_{43} = (C_{41} + C_{42})V_{CC} = C_0 V_{CC}$$

It is thus possible to obtain an initialized capacitor $C_0$ that is not affected by a rotating position of the rotating body 12. For example, in the case where the capacitor $C_{43}$ is arranged inside IC to reduce the temperature dependency thereof, the voltage $V_0$ outputted based on the capacitors $C_0$, $C_{43}$ should be constant. That is, capacitance changes of the variable capacitors $C_{41}$, $C_{42}$ should be free from the influence of any temperature changes. In order to achieve this purpose, the voltage $V_{CC}$ applied to the variable capacitors $C_{41}$, $C_{42}$ is controlled such that temperature changes do not affect the detecting sensitivity.

Figure 32:
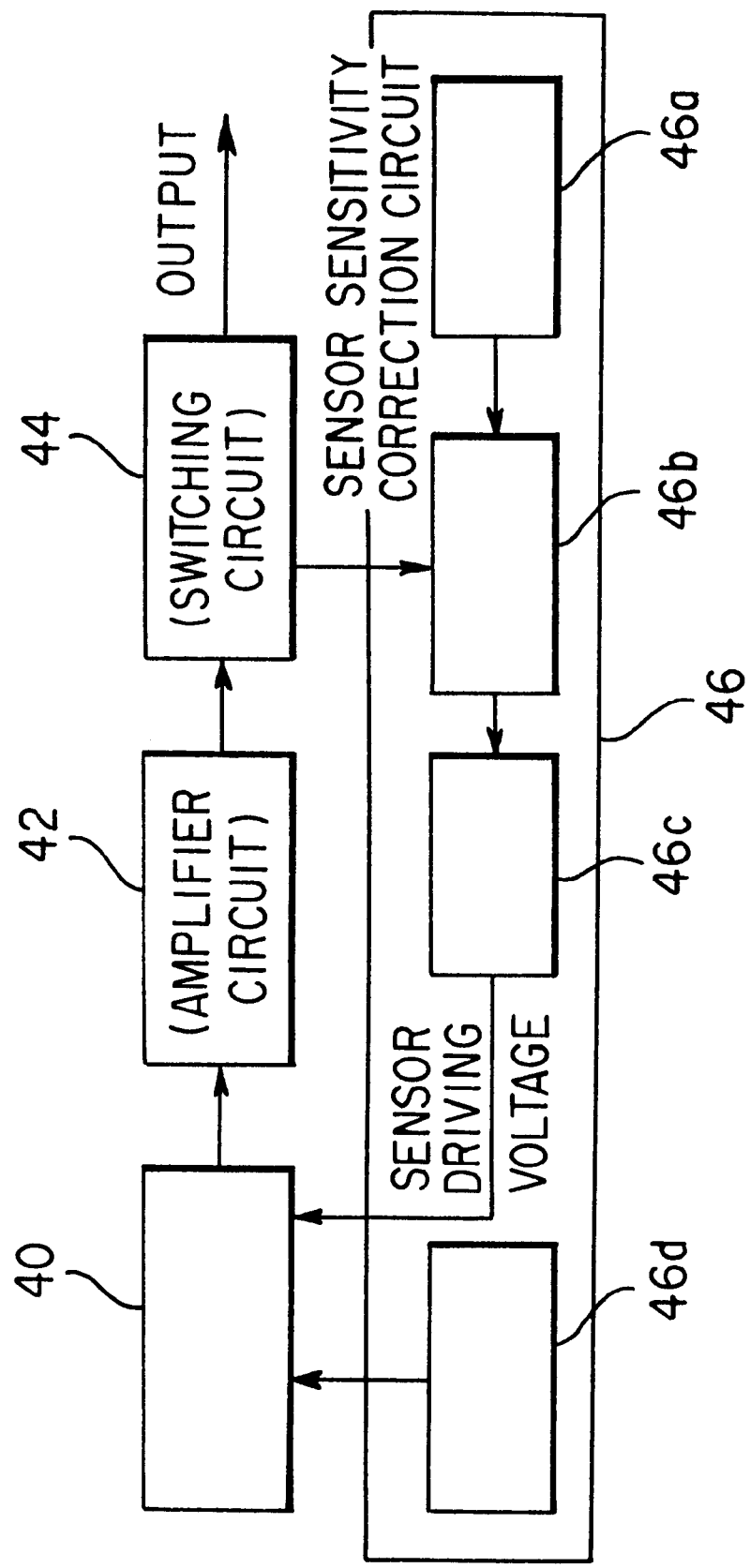
FIG. 32 is a block diagram of the capacitive detector according to the fourth embodiment.

FIG. 32 is a concrete block diagram of the capacitive angle detector 8, which detects an angle by repeating the processes of initialization, correction, initialization and measurement in this order.

First, in the initialization interval, electric charges stored in the respective capacitors and the like constituting a capacitive sensor 40 are discharged. In the correction interval, a capacitance for sensitivity correction is then outputted from the capacitive sensor 40 constituted by the respective capacitors. This capacitance is converted into a voltage in a C-V conversion circuit 42. A control circuit 44 outputs a voltage outputted from the C-V conversion circuit 42 into a sensor sensitivity correction circuit 46. The voltage thus outputted is held in a sensitivity correction voltage holding circuit 46b in the sensor sensitivity correction circuit 46.

In the initialization interval, the respective capacitors and the like constituting the capacitive sensor 40 are then initialized. Thereafter, in the measurement interval, the sensitivity correction voltage held in the sensitivity correction voltage holding circuit 46b is amplified to be applied to the capacitors constituting the capacitive sensor 40 as a sensor driving voltage. The capacitance of the capacitive sensor 40 constituted by the capacitors is converted into a voltage by the C-V conversion circuit 42. The voltage thus converted is outputted from the control circuit 44.

An initial voltage feeding circuit 46d feeds into the capacitive sensor 40 a predetermined initial voltage for generating outputs. Also, a voltage feeding circuit 46a feeds into the sensitivity correction voltage holding circuit 46b a predetermined voltage for adjusting a reference voltage for driving the sensor.

Figure 33:
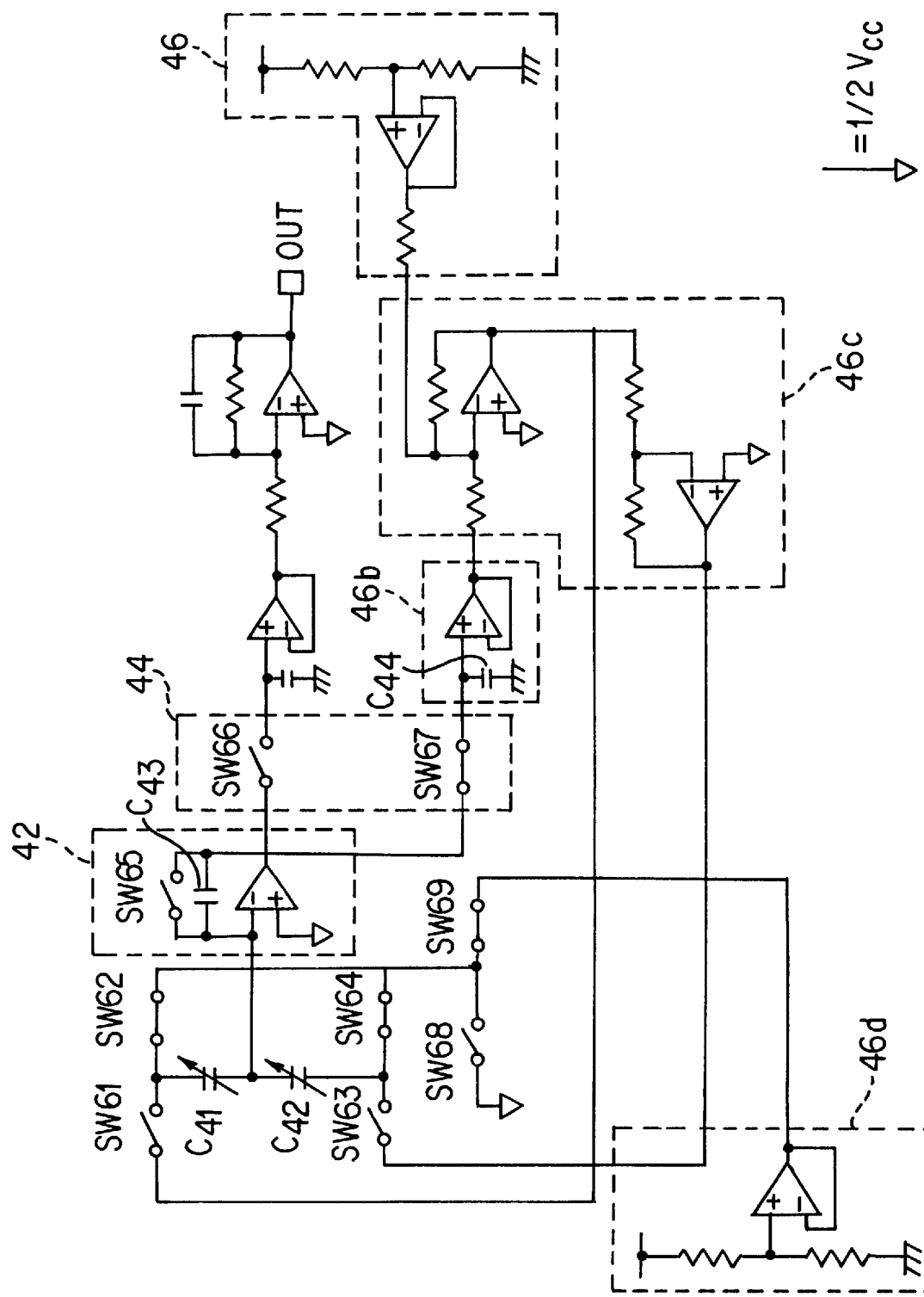
FIG. 33 is a circuit diagram of the circuit of the capacitive detector according to the fourth embodiment.
Figure 34:
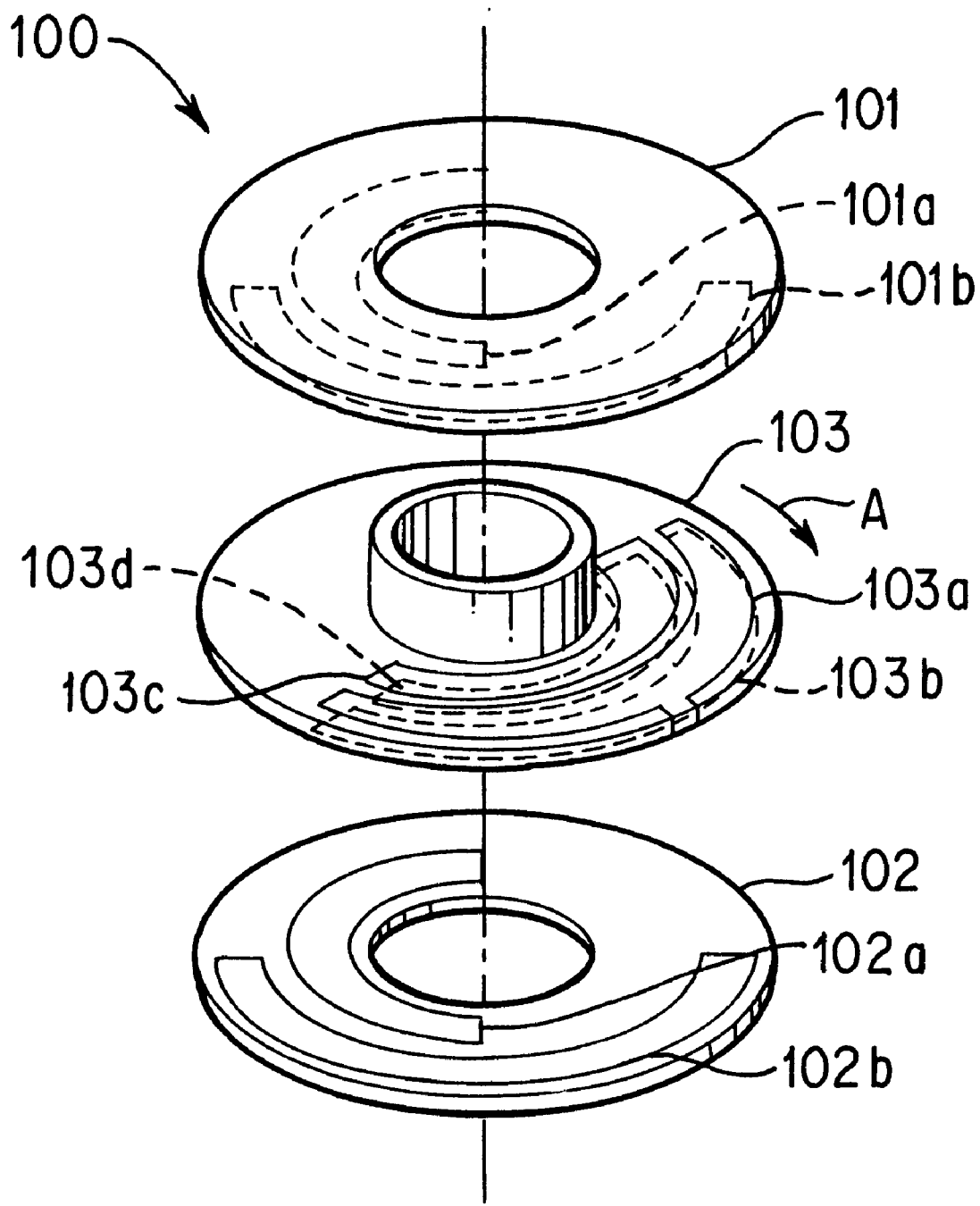
FIG. 34 is a schematic view of a conventional capacitive angle detector.
Figure 35:
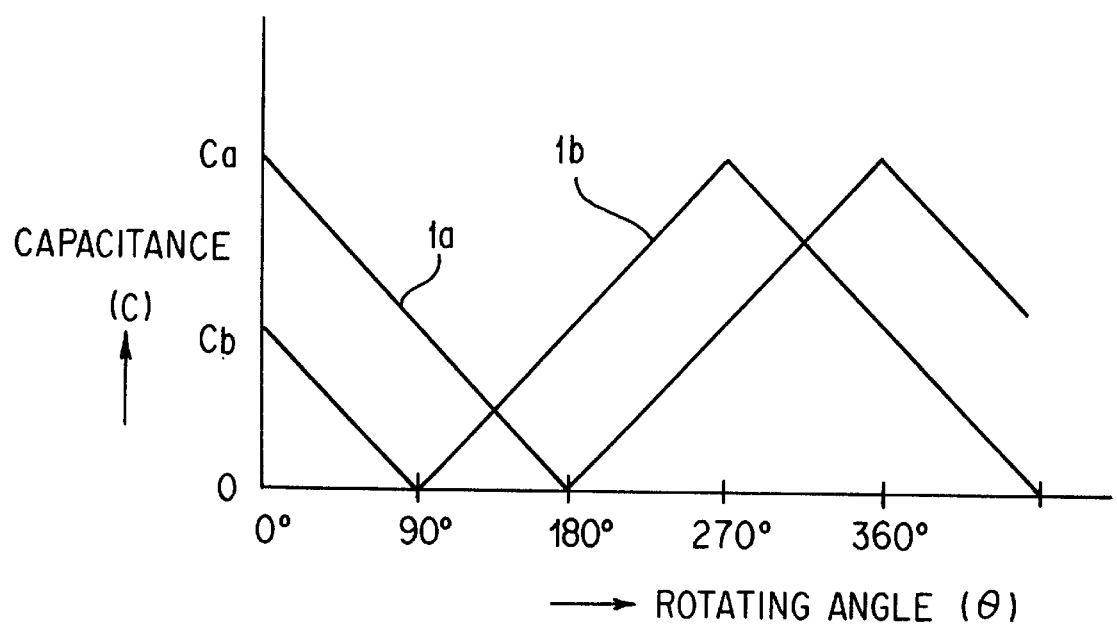
FIG. 35 is a graph illustrating the relationship between a rotating angle of a rotating disk of the conventional capacitive angle detector and capacitance values.

FIG. 33 illustrates a concrete circuit diagram of the capacitive angle detector 8 as illustrated in the block diagram of FIG. 32. Each block as illustrated in the circuit diagram of FIG. 33 is denoted by the same reference numeral as allocated to a corresponding block of FIG. 32.

The respective switches constituting this circuit are controlled as shown in Table 3.

TABLE 3

| | Initialization interval | Correction interval | Measurement interval |
|---|---|---|---|
| SW61 | OFF | OFF | ON |
| SW62 | ON | ON | OFF |
| SW63 | OFF | OFF | ON |
| SW64 | ON | ON | OFF |
| SW65 | ON | OFF | OFF |
| SW66 | OFF | OFF | ON |
| SW67 | OFF | ON | OFF |
| SW68 | ON | OFF | OFF |
| SW69 | OFF | ON | OFF |

As shown above, in the initialization interval, switches $sw_{62}$, $sw_{64}$, $sw_{65}$, $sw_{68}$ and the other switches are turned ON and OFF respectively, so that electric charges stored in the variable capacitors $C_{41}$, $C_{42}$, the reference capacitor $C_{43}$ and the like are discharged.

In the correction interval, switches $sw_{62}$, $sw_{64}$, $sw_{67}$, $sw_{69}$ and the other switches are turned ON and OFF respectively, so that the initial voltage feeding circuit 46d feeds an initial voltage into the capacitive sensor 40 constituted by the variable capacitors $C_{41}$, $C_{42}$. As a result, electric charges corresponding to the capacitance sum of the variable capacitors $C_{41}$, $C_{42}$ are stored into the reference capacitor $C_{43}$ in the C-V conversion circuit 42 and then outputted as a voltage. Electric charges corresponding to this voltage are stored into a feedback capacitor $C_{44}$.

In the measurement interval, switches $sw_{61}$, $sw_{63}$, $sw_{66}$ and the other switches are turned ON and OFF respectively, so that the difference in capacitance between the variable capacitors $C_{41}$, $C_{42}$ is converted into a voltage by the C-V conversion circuit 42 to be outputted from the control circuit 44.

The precision in detecting an angle of this capacitive angle detector 8 of the fourth embodiment is free from the influences of ambient temperature changes. It is thus possible to operate the capacitive angle detector 8 stably.

The above description of the fourth embodiment has dealt with temperature as a noise factor that could inadvertently affect the capacitors. It is to be noted, however, that the capacitive angle detector 8 of the fourth embodiment is also capable of eliminating the influences of humidity, dew formation or the like.

According to the present invention, the third member is made of a dielectric material or a conductive metal material, and electric charges are immovable among the capacitors irrelevant to measurement. Hence, there is no possibility of capacitive coupling occurring in the third member. Furthermore, it is possible to prevent electric charges stored in the capacitors irrelevant to detection from affecting the capacitors relevant to detection. The precise detection of a rotating angle thereby becomes possible.

In addition, the capacitive angle detector having a reference capacitor changes voltages to be applied to the capacitors based on capacitance values of the capacitors that have been changed by disturbances and a capacitance value of the reference capacitor. In this case, the voltages thus applied can eliminate the influences of disturbances on capacitance changes of the capacitors, thereby enhancing a precision in detecting an angle.

While the present invention has been described with reference to what are presently considered to be preferred embodiments thereof, it is to be understood that the present invention is not limited to the disclosed embodiments or manufacturing methods. To the contrary, the present invention is intended to cover various modifications and equivalent arrangements included within the spirit and scope of the appended claims.

What is claimed is:

1. A capacitive angle detector comprising:
   a first member having at least one electrode;
   a second member having a plurality of electrodes thereon to define a plurality of capacitors with at least said one electrode on said first member, the first and second members being non-rotatable with respect to and arranged opposite each other;
   a third member arranged between said first and second members and moving relative to said first and second members in accordance with rotating movement of a rotating body, said third member thereby changing capacitance values of said capacitors; and
   said capacitive angle detector detecting a rotating angle of said rotating body based on the capacitance values of said capacitors,
   wherein said third member is made of at least one of a dielectric material and a conductive metal material and is partially interposed between said at least one electrode and said plurality of electrodes of said first and second members, respectively,
   the capacitors defined by said first and second members are composed of a plurality of sets of capacitors, and, in accordance with rotating movement of said third member, the capacitance values of respective sets of the capacitors change with a predetermined phase difference, and
   said at least one electrode on said first member arranged opposite said plurality of electrodes on said second member comprises large and small-diameter circular electrodes each having a predetermined width, and said electrodes on said second member are formed by half-dividing large and small-diameter circular electrodes each having a predetermined width and offsetting the half-divided large and small-diameter electrodes from each other uniformly by 90°.

2. The capacitive angle detector according to claim 1, wherein said first and second members define four capacitors therebetween, and a rotation angle of said rotating body is detected based on a first capacitance difference of two of said capacitors composed of said large-diameter circular electrodes and a second capacitance difference of the other two capacitors composed of said small-diameter circular electrodes.

3. The capacitive angle detector according to claim 1, further comprising a reference capacitor for referencing the capacitance values of said capacitors, wherein voltages applied to said capacitors are changed based on the capacitance values of said capacitors that have been changed by disturbances and a capacitance value of said reference capacitor.

4. A capacitive angle detector comprising:
   first and second members defining at least first and second capacitors therebetween;
   a third member arranged between the first and second members and moving relative to the first and second members to thereby change capacitance values of said first and second capacitors;
   a reference capacitor that references the capacitance values of said first and second capacitors, wherein voltages applied to said first and second capacitors are changed based on the capacitance values of the first and second capacitors that have been changed by disturbances and a reference capacitance value of said reference capacitor; and
   at least one electrode on said first member arranged opposite a plurality of electrodes on said second member, the at least one electrode comprising large and small-diameter circular electrodes each having a predetermined width, said electrodes on said second member being formed by half-dividing large and small-diameter circular electrodes each having a predetermined width and offsetting the half-divided large and small-diameter electrodes from each other uniformly by 90°.

5. A capacitive angle detector comprising:
   a first member having at least one electrode;
   a second member having a plurality of electrodes thereon to define a plurality of capacitors with said at least one electrode on said first member, the first and second members being non-rotatable with respect to and arranged opposite each other;

a third member arranged between said first and second members and moving relative to said first and second members in accordance with rotating movement of a rotating body, said third member thereby changing capacitance values of said capacitors; and said capacitive angle detector detecting a rotating angle of said rotating body based on the capacitance values of said capacitors, wherein said third member is made of at least one of a dielectric material and a conductive metal material and is partially interposed between said at least one electrode and said plurality of electrodes of said first and second members, respectively, and said at least one electrode on said first member is arranged opposite said plurality of electrodes on said second member, the at least one electrode comprising large and small-diameter circular electrodes each having a predetermined width, said electrodes on said second member being formed by half-dividing large and small-diameter circular electrodes each having a predetermined width and offsetting the half-divided large and small-diameter electrodes from each other uniformly by 90°.

* * * * *